July 26, 1955  J. R. DOWNING  2,714,202
RECORDING SYSTEM UTILIZING A SINGLE CONTROL SIGNAL CAPABLE
OF CONTROLLING TWO CHARACTERISTICS OF THE SIGNAL
Filed Oct. 19, 1948  8 Sheets-Sheet 2
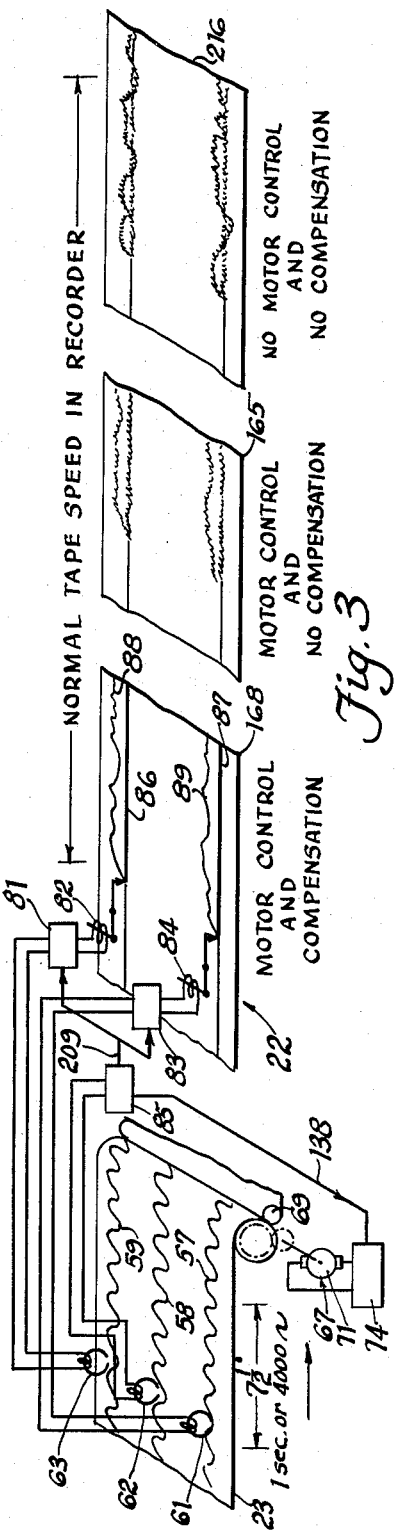
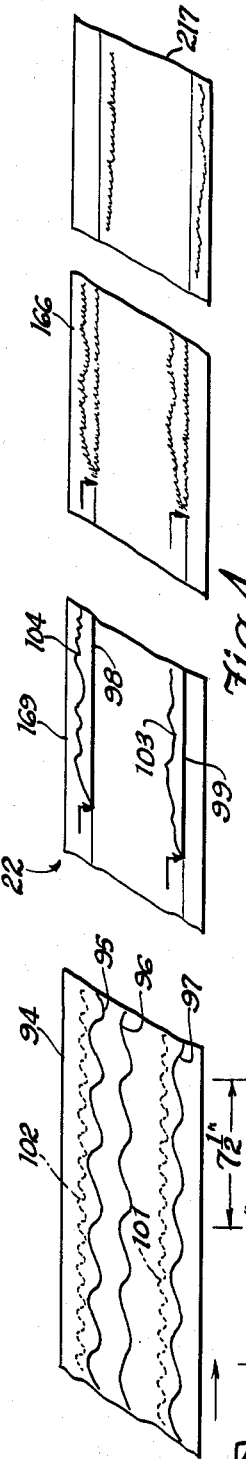
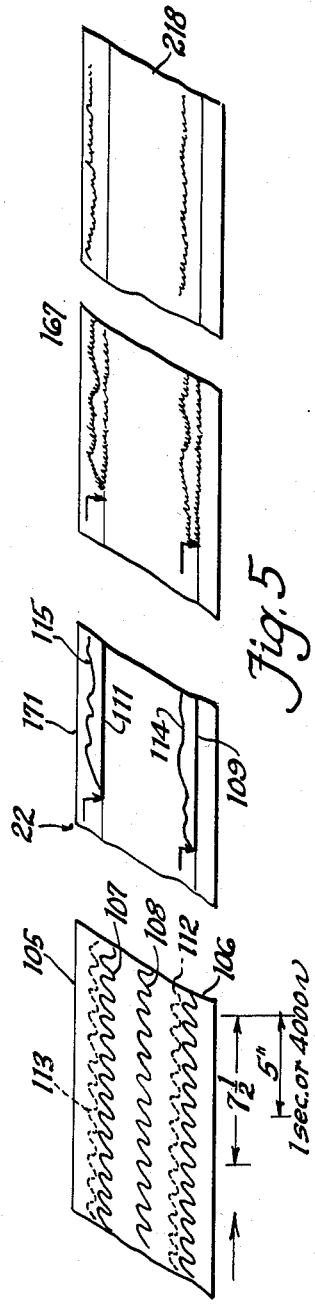
INVENTOR.
James Robert Downing
Theim, Olsen & Mecklenburger
attys July 26, 1955  J. R. DOWNING  2,714,202
RECORDING SYSTEM UTILIZING A SINGLE CONTROL SIGNAL CAPABLE
OF CONTROLLING TWO CHARACTERISTICS OF THE SIGNAL
Filed Oct. 19, 1948  8 Sheets-Sheet 3

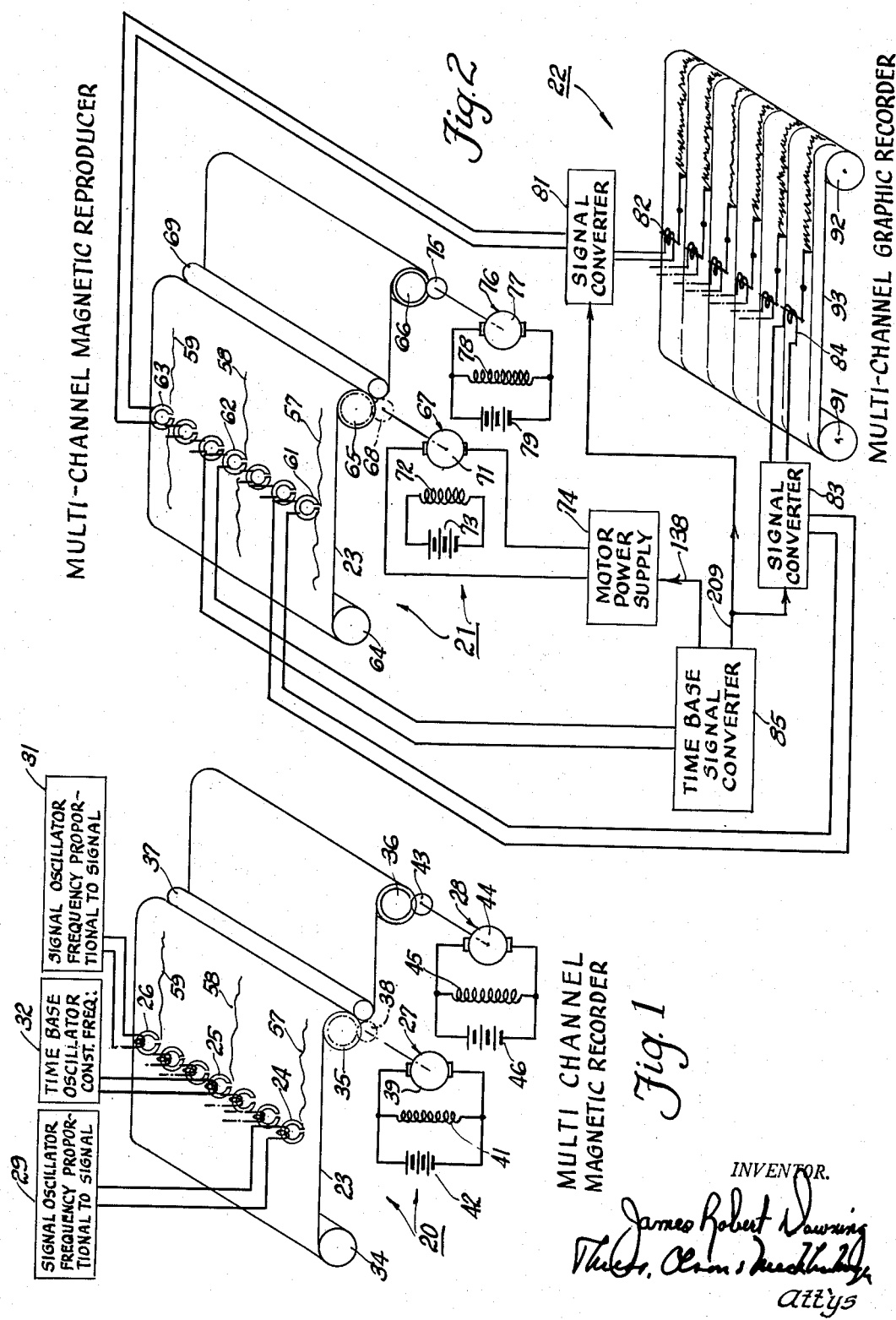

INVENTOR.
James Robert Downing
Attys

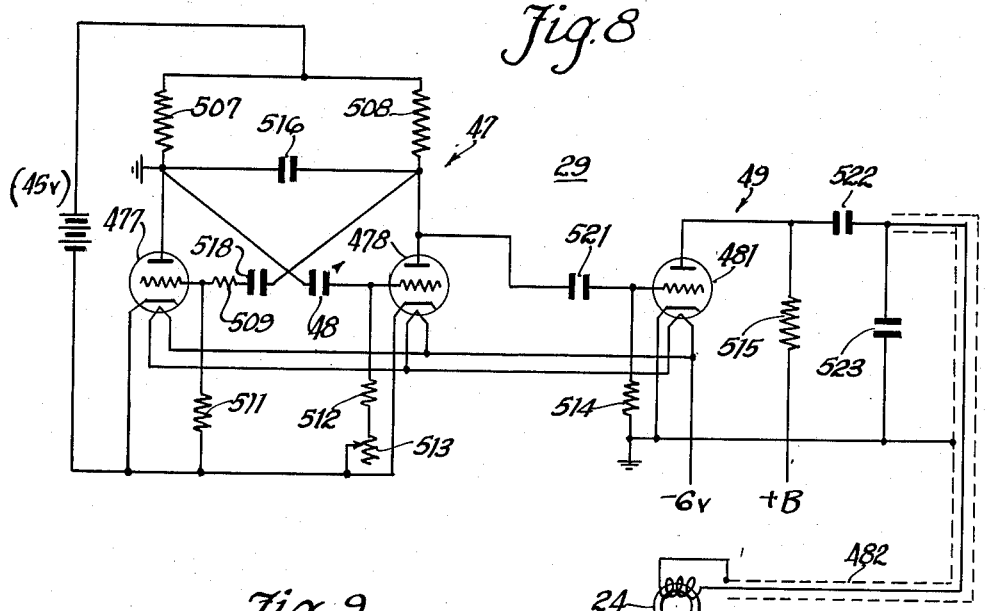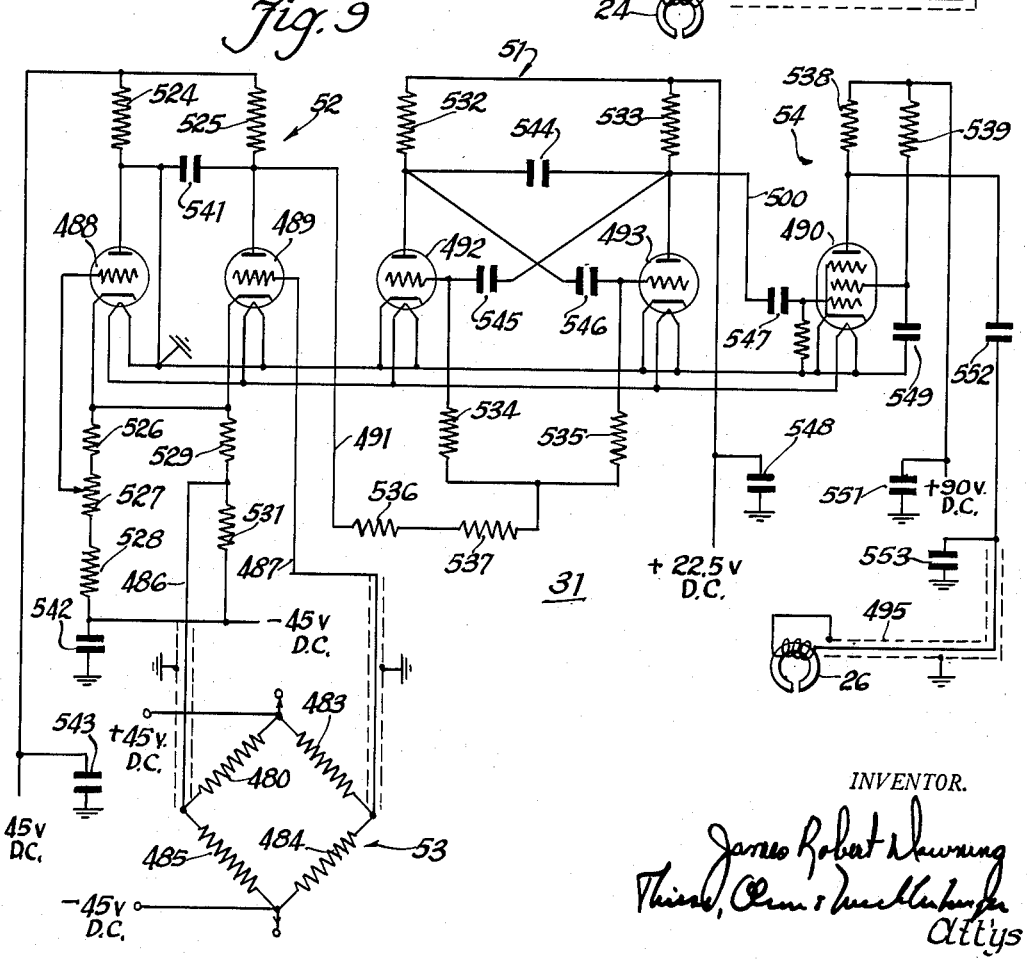

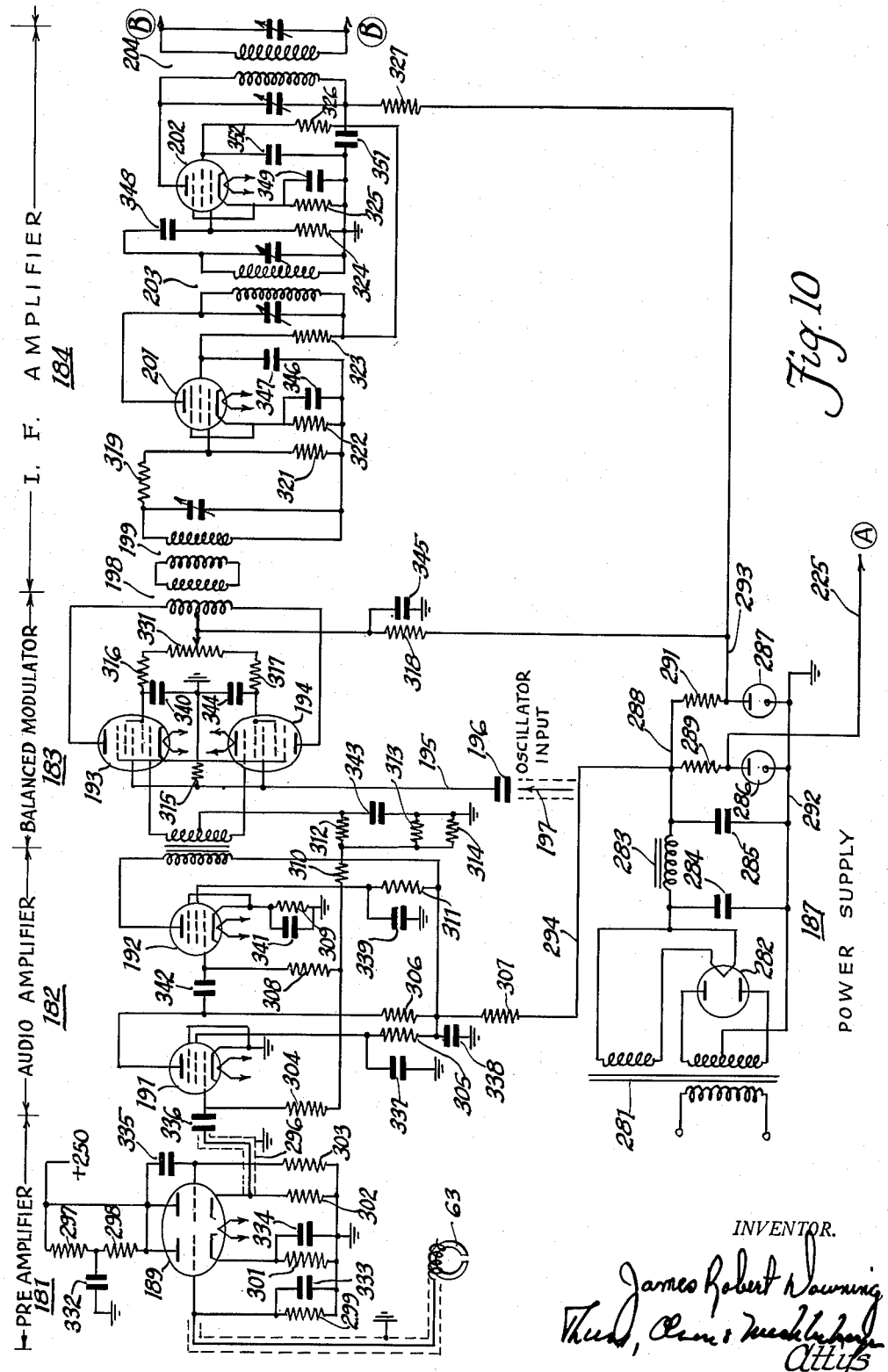

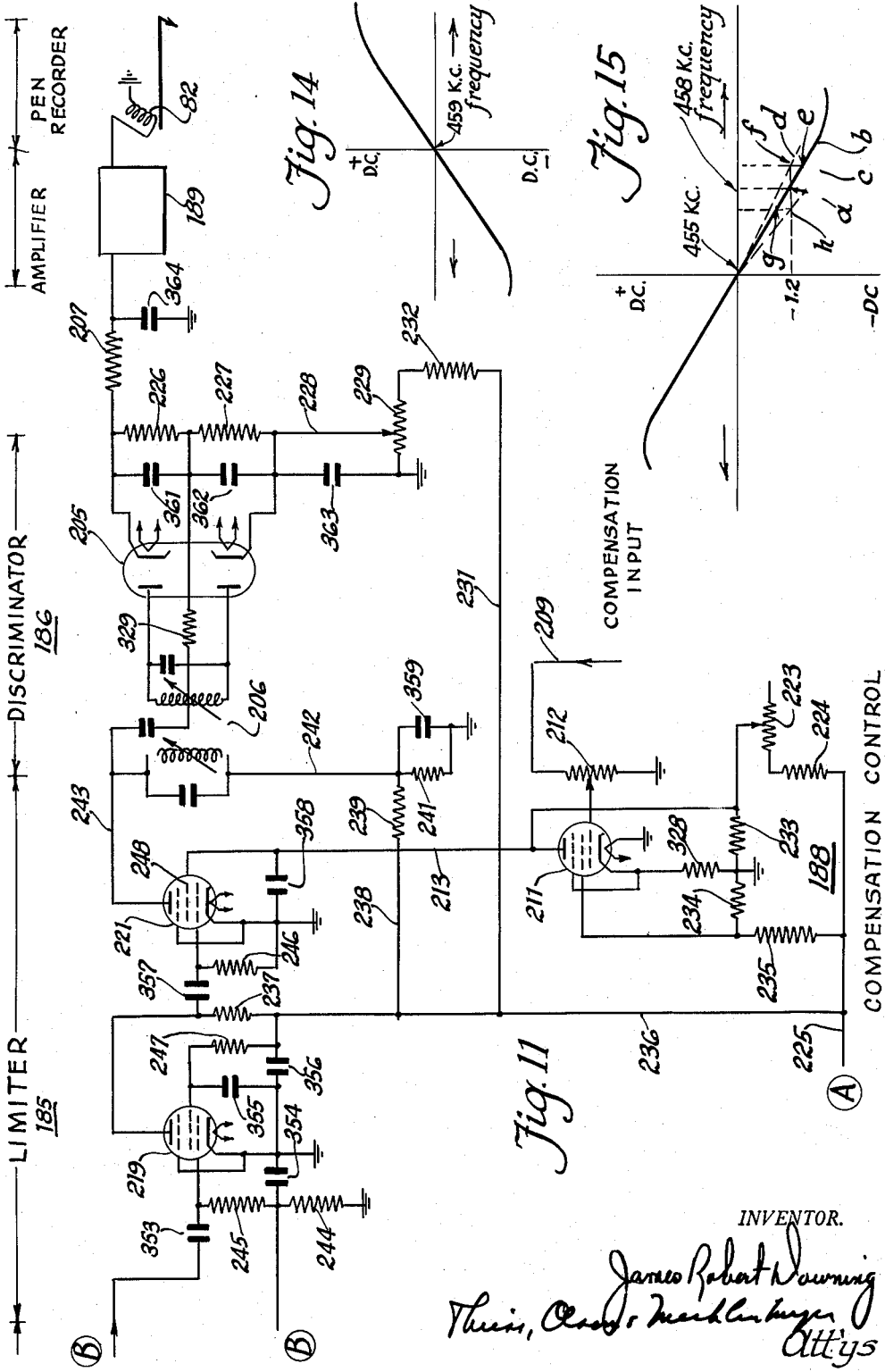

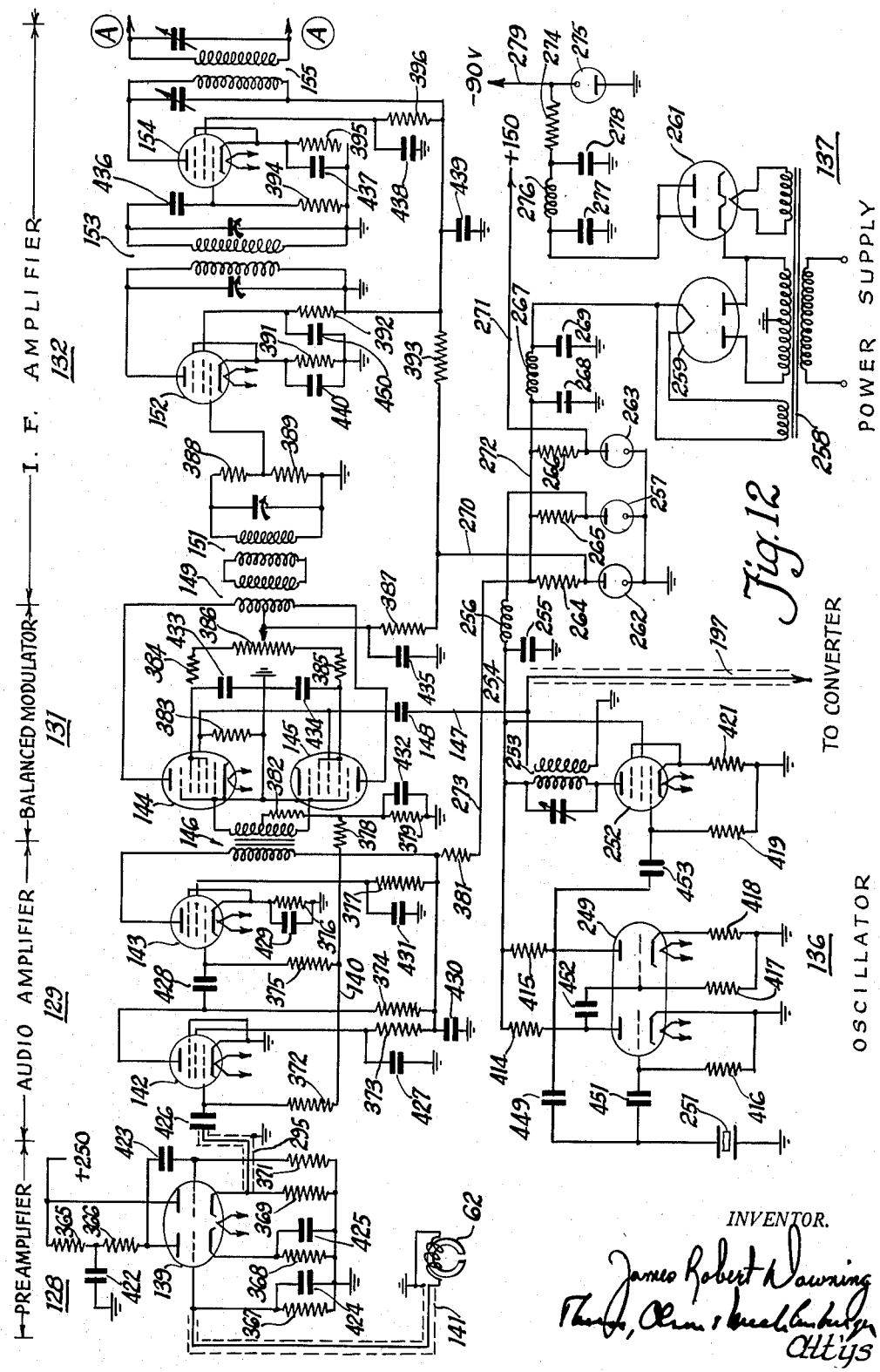

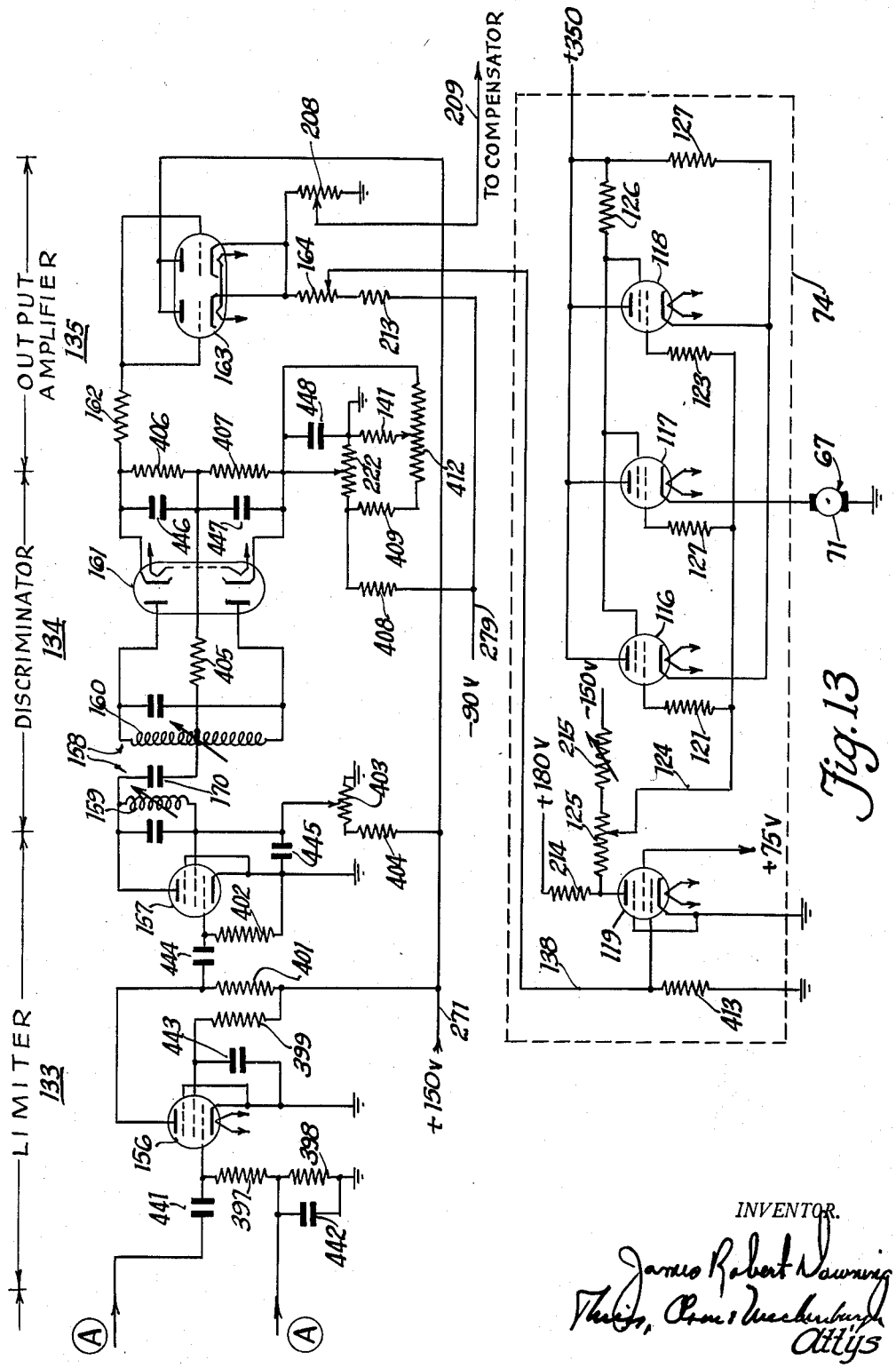

United States Patent Office 2,714,202
Patented July 26, 1955

2,714,202

RECORDING SYSTEM UTILIZING A SINGLE CONTROL SIGNAL CAPABLE OF CONTROLLING TWO CHARACTERISTICS OF THE SIGNAL

James Robert Downing, Chicago, Ill., assignor to Cook Electric Company, Chicago, Ill., a corporation of Illinois Application October 19, 1948, Serial No. 55,358

8 Claims. (Cl. 340—174)

This invention relates to methods and apparatus for recording or storing data or information on a medium, and for reproducing such data or information from the medium into an observable form, for example on an indicating meter or in graphical form. More particularly the invention relates to improved methods and apparatus of the character described wherein the recording is done at one point and the reproducing is done at another, and it is an object of the invention to provide improved methods and apparatus of this character.

In many instances it is desirable or even necessary to have information or data about processes going on where it is impossible to have an observer present to make the measurements and record them for future use. For example, in a guided missile it is desirable to know what the acceleration, velocity, and other factors relating to the missile are, as well as the temperature, pressure, and other characteristics of the air through which the missile is traveling. Likewise, in developing techniques for dropping articels from aircraft involving the use of parachutes, the opening shock, the landing shock, the rate of descent, and other factors relating to the object dropped are quantities to be measured while the process is going on. Obviously, human beings cannot be present to make observations of such data, and consequently the data must be recorded by instruments on board the test body in such a form that the data can be reproduced, or the data must be transmitted by radiation to recording instruments or personnel on the ground. The latter course requires the use on board the test body of radiating equipment as well as the presence of recording personnel or apparatus on the ground functioning at the time the test is proceeding. Accordingly, it is advantageous to record the information on the test body and to reproduce the data subsequently.

While in the examples given the point of recording the data may be far removed from the point of reproducing the data, it will be understood that the invention has application as well to instances where the points of recording and reproducing are near each other. Moreover, the reference to parachutes and guided missiles is only by way of example, the invention having application to recording and reproducing as such.

Before data can be recorded, it must be transformed into an effect which is recordable, and since the time of recording may extend over some length of time, which may vary from a fraction of a second to several minutes or longer, some form of continuous record must be made. Making a continuous record requires mechanism to move a recording medium as well as test recording apparatus, and in applications such as those described where accelerations are large or there are transients of short duration, it is imperative that the recording medium be as free as possible from elements which prevent proper functioning under such circumstances. This makes it preferable to reduce the mechanical elements to a minimum. One form of such recording apparatus is magnetic in character wherein the recording is in the form of magnetic influences or patterns on a magnetic medium such as a wire or tape. The recording being done by supplying a signal to a recording head which sets up a magnetic field influencing the medium, many mechanical elements may be eliminated. While the invention is described in connection with magnetic recording, it will be understood that other forms may be used, such for example as varying light density on a film or others.

Where the information to be recorded is of a continuous character extending over a period of time, the time at which any piece of data occurred must be noted, this being conveniently accomplished by a recording on a moving magnetic medium inasmuch as the rate of movement past the recording head supplies a measure of the instant a particular indication was made.

The magnetic effect on the tape member (medium) may have any characteristic which embodies within it the data to be recorded. Frequency, amplitude, wave form, and other characteristics may be made use of, but it has been found that frequency is preferable inasmuch as noise, variations in supplied voltages, etc., do not have any effect thereon. Accordingly, it is a further object of the invention to provide improved methods and apparatus for recording data or information wherein any data or information to be recorded is first converted into alternating or undulating voltages whose frequency of alternation or undulation is a function of the data and thereafter an effect corresponding to the frequency is recorded on a moving medium.

In a guided missile test or a parachute drop test, the acceleration of the body from the beginning of the test to the end may be desired. For this purpose, one or more accelerometers are installed. The accelerations indicated thereby may be obtained in the form of a D. C. voltage which is used as an input to an oscillator which produces an alternating voltage of substantially constant amplitude, but of a frequency which varies in accordance with variations in the D. C. voltage. Thus for no acceleration an A. C. voltage of some frequency, for example 3,500 cycles per second, may be generated. For positive accelerations the frequency may increase, and for negative accelerations the frequency may decrease. This A. C. voltage may be amplified if necessary and supplied to a magnetic recording head. A magnetic tape or wire moving past the recording head will then have a magnetic pattern produced therein which corresponds to the alternating voltage applied to it, and particularly the pattern embodies the frequency of the alternating voltage.

During such a recording process, the magnetic medium is driven past the recording head at substantially constant speed. To reproduce the data, it is necessary to take the tape or other medium upon which the information has been recorded and move it past a reproducing head at the same speed that the tape was run during recording. When this is done, the variations in magnetic effect on the tape will, of course, produce an alternating voltage in the reproducing head which voltage may be amplified and applied to an indicating instrument, or it may be applied to some form of graphical recording instrument wherein a continuous record on paper is made. The tape during reproducing running at the same speed as during recording, it will be evident if a frequency of 3,500 cycles per second was recorded, this same frequency will be indicated on reproducing which frequency may then be changed into a D. C. voltage through the use of discriminators. If the body experienced a positive acceleration the recorded frequency would be higher, for example 4,000 cycles per second, which will be indicated on reproducing, and likewise if the body experienced a negative acceleration the recorded frequency would be lower, perhaps 3,000 cycles per second. In this instance the final indication will be a measure of greater or lesser acceleration.

While in this application the effects of sine wave voltages are recorded with a proper frequency, it will be understood that other wave shapes may be used and even pulses may be used so long as the frequency of recording is a measure of the data to be recorded.

In the recording and reproducing method described, it is essential that the magnetic medium be operated at the same speed during reproducing as during recording, otherwise completely false indications are obtained. For example, in tests such as those described where accelerations may be high, it is apparent that accelerations will momentarily either slow down or speed up the movement of the tape thereby giving an apparent change in the recorded frequency even though such has not been the case. Likewise, changes in driving motor voltage may cause the tape to speed up or slow down. When this tape is placed in reproducing apparatus, this apparatus has no way of knowing what the speed of the tape was during recording. Accordingly, it is a further object of the invention to provide improved apparatus of the character indicated wherein improved method and apparatus are provided for maintaining the speed of the recording medium during reproducing substantially the same as that during recording.

It is a further object of the invention to provide improved apparatus of the character indicated wherein an improved method and apparatus are provided for maintaining the speed of the medium constant during reproducing.

According to one form of the invention, the same medium speed is maintained during recording and reproducing by recording the effect of a voltage of constant frequency during the recording process and then utilizing the effect of this recording during reproducing to control the speed during reproducing. That is to say, when a constant frequency is recorded and the speed of the recording medium is changing during the recording, the detected or apparent frequency when the medium is moved during reproducing is different than the constant frequency which was recorded. This difference between the constant frequency and the apparent or detected frequency is used to vary the speed of the motor driving the tape during reproducing to maintain its speed at a value equal to the tape speed during recording.

Relatively slow changes in speed of the motor driving the tape during recording are relatively easily taken into account during reproducing inasmuch as the driving motor during reproducing can speed up or slow down as rapidly as can the motor during recording when the speed changes are due to motor effects alone. However, in apparatus where transients occur, such for example as the initial high acceleration during parachute opening, the movement of the tape during recording may be very rapid for a small interval of time. When this tape is being played back for reproducing, the apparent change in frequency will be very rapid, and even though the motor by the method and apparatus to be described will receive a signal to speed up or slow down, it is physically impossible for the motor to do so in less than a certain interval of time. This results in errors. Accordingly, it is a further object of the invention to provide improved methods and apparatus to compensate, in apparatus of the character described, for errors in the reproduced information resulting from very rapid changes in tape speed during recording due to transients and the like which the driving motor during reproducing cannot follow. According to one form of the invention this is carried out by utilizing the difference between the constant recorded frequency and the apparent frequency detected during play-back or reproducing to vary the setting of the discriminators producing the signal corresponding to the recorded data. The discriminators, being electronic apparatus, become operative virtually instantaneously to compensate for transient conditions.

For a more complete understanding of the invention, reference should be had to the accompanying drawings in which:

Figure 1 is a diagrammatic representation of magnetic recording apparatus embodying the invention;

Fig. 2 is a similar diagrammatic representation of reproducing apparatus embodying the invention;

Fig. 3 is a diagrammatic representation of the apparatus shown in Fig. 2 illustrating certain conditions of operation;

Fig. 4 is a diagrammatic view similar to Fig. 3 illustrating further conditions of operation;

Fig. 5 is a diagrammatic view similar to Figs. 3 and 4 illustrating further conditions of operation;

Fig. 8 is a diagrammatic view of an oscillator generating a frequency varying with acceleration and a recording head;

Fig. 9 is a diagrammatic view of an oscillator generating a frequency proportional to tension and a recording head;

Figure 6:
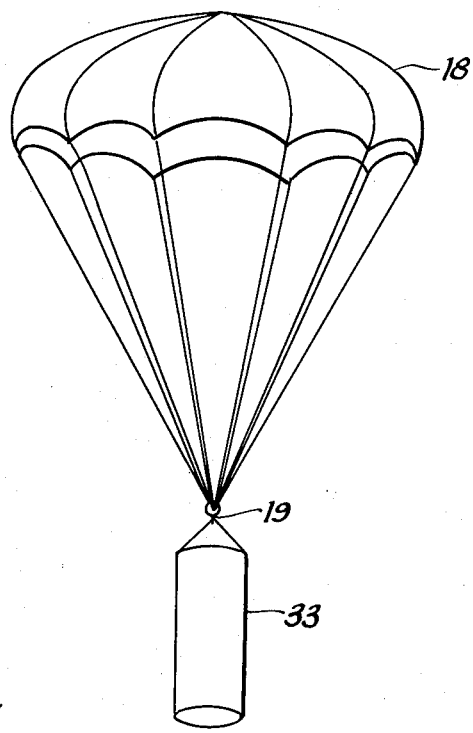
Fig. 6 is a diagrammatic view of the parachute and gondola illustrating one form of apparatus to which the invention has application.

Figs. 10 and 11, taken together, are a circuit diagram of the data reproducing apparatus;

Figs. 12 and 13 are a circuit diagram of the apparatus for producing motor speed control and transient compensation;

Fig. 14 is a diagram illustrating operation of a portion of Figs. 12 and 13, and Fig. 15 is a similar diagram illustrating operation of a portion of Figs. 10 and 11.

*General description*

Referring to the drawings, and particularly Figs. 1 and 2 thereof, the invention is shown embodied in magnetic recording apparatus 20, magnetic reproducing apparatus 21, and graphic recording apparatus 22.

Magnetic recording apparatus 20 comprises a magnetic medium 23, a series of magnetic recording heads, specifically recording heads 24, 25 and 26, arranged side by side and adjacent to the magnetic medium, and motors 27 and 28 respectively for driving the magnetic medium and for taking up the medium on a storage reel. Alternating voltage signals whose frequencies represent data to be recorded are supplied to heads 24 and 26 from signal oscillators 29 and 31, and an alternating voltage having a constant frequency is supplied to head 25 from a time base oscillator 32. Additional recording heads are illustrated in Fig. 1, but are not shown as being supplied with signal voltages inasmuch as these recording heads and their signal oscillators may be similar to those to be described, differing only in the particular data to be recorded.

Throughout this specification, wherever apparatus is referred to as exemplary, or data are given as exemplary, or either is given as being according to one form of apparatus, it will be understood that a single form of apparatus is being referred to.

The apparatus shown is a diagrammatic view of actual apparatus constructed and used, the magnetic recording apparatus including the various oscillators, the magnetic medium, motors, etc., being placed into a gondola 33 attached to a parachute 18 (Fig. 6) for testing the various quantities relating to parachute opening. Thus, for example, three accelerometers were used to determine accelerations in three different planes, a tensiometer was used to determine the tension in the link 19 between gondola 33 and parachute 18, an altimeter, and a rate of descent meter were used. Data from each of these instruments is transformed into an A. C. voltage which is amplified and transmitted to a corresponding one of the recording heads. An effect corresponding to the frequencies of each of the oscillators is then recorded in its own channel along the magnetic medium 23.

Magnetic medium 23 may be a tape substantially as shown comprising some supporting or backing material covered with a thin layer of magnetic material having a high retentivity. The tape is furnished on a supply reel 34 and extends underneath the recording heads, around a driving capstan 35, and on to a storage reel 36. An idler roller 37 may be provided, as shown, and suitably supported for holding the tape against the capstan which is driven from motor 27 through any form of non-slipping connection, such for example as gears 38 shown diagrammatically and having the proper number of teeth to drive the capstan at the desired speed. Motor 27 may be of the direct current type having an armature 39 and a shunt field 41, power being supplied to both the field and the armature from a battery 42.

The takeup or storage reel 36 is driven from motor 28 through any suitable means, such for example as a wheel 43 frictionally engaging a corresponding member associated with reel 36. Motor 28 is of the direct current type including an armature 44 and a shunt field 45, power being supplied both to the armature and to the shunt field from a battery 46. The connection between wheel 43 and takeup reel 36 is shown as a friction connection in order that some slippage may take place. Thus motor 28 may tend to drive reel 36 at a rate faster than capstan 35 permits the tape to move, thereby maintaining tension upon the tape between the capstan and the takeup reel. Accordingly, no slack exists. While a friction connection has been shown, it will be apparent that other forms of slipping drives or overdriving devices may be used. The connection between capstan 35 and the shaft of motor 27 is a gear connection inasmuch as the capstan drive must be positive to prevent slipping in order to maintain the speed of the tape as nearly constant as possible. Other forms of connection, of course, may be used. In order to prevent slack from existing between supply reel 34 and capstan 35 some form of restraining means, such for example as a brake (not shown), may be associated with supply reel 34.

The invention has application to structures of the character described irrespective of how the magnetic medium is moved past the recording head and thus the drive means are shown schematically.

The recording heads are substantially identical with each other and comprise a magnetic member having an air gap which is immediately adjacent the magnetic medium, and a coil on the magnetic member for receiving the signal to be recorded.

Considering Figs. 1, 6, 7, 8 and 9 together, the manner of magnetically recording the data may best be explained.

In Fig. 8 there is shown an oscillator 47 of the multivibrator type, the frequency of which is varied by varying the condenser 48, and an amplifier 49 amplifying the output of the oscillator and feeding it to recording head 24. The variable condenser 48 is part of an accelerometer wherein the acceleration determines movement of one condenser plate and thus the capacity setting, thereby determining the frequency of oscillator 47. The oscillator to be described in greater detail subsequently in this specification may be set to generate a frequency of 3,500 cycles per second when no acceleration is being experienced. Then with acceleration in one direction the plates of the condenser may move closer together, resulting in an increase in the frequency generated, for example up to 4,000 cycles per second, and correspondingly with accelerations in the opposite direction the frequency may decrease from 3,500 cycles per second to 3,000 cycles per second. Oscillator 47 and amplifier 49 of Fig. 8 thus comprise the signal oscillator 29 of Fig. 1.

Similarly in Fig. 9 there is shown an oscillator 51 of the multivibrator type to which a varying signal is supplied from a balanced D. C. amplifier 52 which in turn is supplied with the output of a tensiometer 53. An amplifier 54 receives the output from oscillator 51 and feeds it to recording head 26. Bridge 53 may form part of link 19 connecting gondola 33 and parachute 18 so that the voltage developed across the bridge is a function of the tension in the connecting link. This voltage, when amplified by amplifier 52 and fed to oscillator 51, determines the frequency of this oscillator which may be set for 3,000 cycles per second for no tension, and for 4,000 cycles per second for maximum tension. The various components of oscillator 51 and amplifiers 52 and 54 will be described more completely subsequently in this specification. Oscillator 51, amplifiers 52 and 54, and bridge 53 thus comprise the signal oscillator 31 of Fig. 1.

Figure 7:
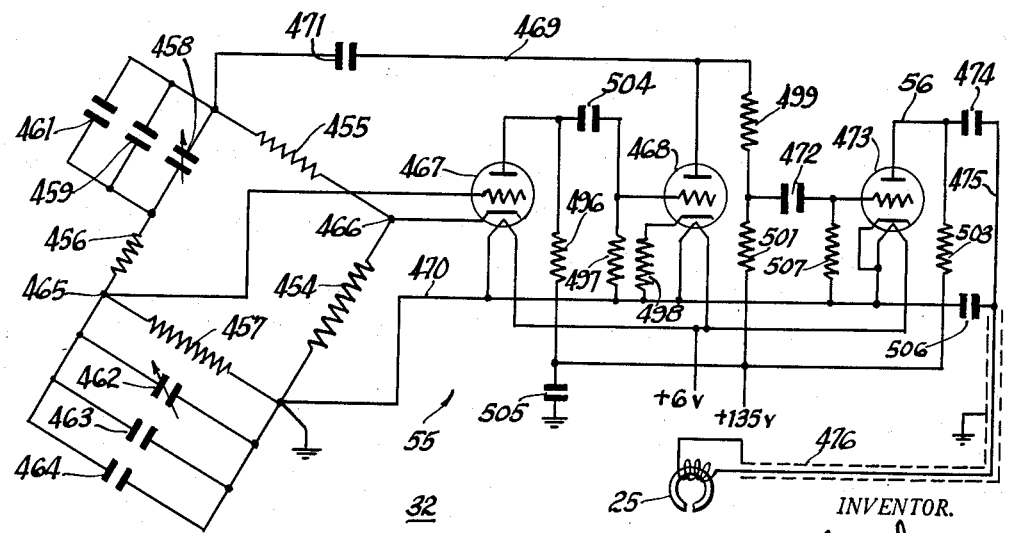
Fig. 7 is a diagrammatic view of a constant frequency oscillator and recording head.

In Fig. 7 there is shown a Wien bridge type oscillator 55 and an amplifier 56 feeding an A. C. voltage to recording head 25. The Wien bridge oscillator may be set to generate a constant frequency of 4,000 cycles per second. Thus oscillator 55 and amplifier 56 comprise the time base oscillator 32 of Fig. 1.

Assuming that the apparatus is functioning, that is, the parachute has been dropped, then the motors 27 and 28 are operating to move tape 23 past the recording heads, the various oscillators are functioning, and are supplying A. C. voltages to the respective recording heads. Accordingly, magnetic impressions or effects are being made on the tape, each recording head forming a line or channel of such impressions along the tape, the magnetic variations in the tape having the frequency of the supplied signal. The channel formed by head 25 is termed the time base channel throughout this specification, and the channels formed by the remaining heads, e. g. 24 and 26, are termed signal channels. These channels are shown as wavy lines 57, 58, and 59 on the tape. These lines simulate sine waves the undulations of which, taken in conjunction with the tape speed, correspond to the frequencies of the recorded signals.

It will be understood that wavy lines are shown for purposes of explanation since no waves appear on the tape, it having only magnetic variations in it with the periodicity shown.

The tape may move past the recording heads at any desired constant speed, it having been found that 7½ inches per second is satisfactory. At this speed recording head 25 provides 4,000 cycles of magnetic variations in its channel on each 7½ inches of the tape. Similarly, recording heads 24 and 26 supply the number of cycles determined by their input instruments. Thus during the 7½ inches of movement, signal oscillator 29 may deliver more or less than 3,500 cycles, and signal oscillator 31 may deliver between 3,000 and 4,000 cycles. If the tape slows down due to a voltage change to driving motor 27, for example, so that the tape moves at 5 inches per second, 4,000 cycles of magnetic variations will be impressed on the tape in the time base channel in 5 inches. Likewise, if the driving motor speeds up for some reason to where the tape moves 10 inches per second, for example, then recording head 25 records 4,000 cycles in the time base channel in 10 inches of tape. Similarly, during these different speeds, heads 24 and 26 are recording the number of cycles supplied thereto in the shorter or longer tape space.

Changes in speed of motor 27 may take place relatively slowly, but due to accelerations experienced in the use of the apparatus (possibly many times that of gravity), the tape may speed up or slow down small or large amounts in short intervals of time thereby causing the generated frequencies to be recorded on longer or shorter intervals of tape rapidly. If such a tape is then moved at a constant speed, the apparent frequency of recording, even though constant, appears to have suddenly increased or decreased very rapidly.

Referring more particularly to Fig. 2, magnetic reproducer 21 comprises a series of seven magnetic reproducing or play-back heads of which heads 61, 62 and 63 are particularly designated, and apparatus for driving a tape past the play-back heads which comprises a supply reel 64, a driving capstan 65, and a takeup reel 66. Driving capstan 65 is driven by a motor 67 through a non-slipping connection such for example as a gear 68, and an idler roller 69 is provided to maintain the magnetic medium in contact with the capstan.

Motor 67 includes an armature 71 and a field 72 which is supplied with current from a battery 73, armature 71 being supplied with a regulated voltage from a motor power supply unit 74 in order that its speed may be regulated. Takeup reel 66 is shown driven through a friction pulley 75 by a motor 76. Motor 76 includes an armature 77 and a field 78, both of which are supplied with power from a battery 79. Motor 76 is set to operate at a speed such that reel 66 tends to take up the magnetic medium at a rate greater than the capstan drives it, thereby maintaining tension between the takeup reel and the capstan and no slack exists therebetween. Similarly, some form of brake mechanism, not shown, may be associated with supply reel 64 in order to prevent slack in the tape between the supply reel and the capstan. As thus far described, except for the power supply of motor 67, the magnetic reproducer is substantially similar to the magnetic recorder. In the operation of the reproducer, tape 23 which has previously been run through the recorder is used, play-back or pick-up heads 61, 62, and 63 corresponding respectively to the recording heads 24, 25, and 26.

Graphic recorder 22 may be of any well known form having the necessary number of channels, and comprises a pair of reels 91 and 92 arranged to be suitably driven to transfer a web of paper 93 from reel 91 to reel 92, and a series of pens, one for each information channel, each pen being adapted to be actuated by a coil supplied with a signal from a signal converter. Web or chart 93 may, of course, be moved at a uniform rate of speed and thus an indication of the time at which a particular signal occurred may be had.

Referring to Figs. 2 and 3, and assuming that tape 23, upon which signals as described have been recorded while the tape was running at the normal speed of 7½ inches per second, is being run through reproducer 21 at the same normal speed, the operation of the device may best be understood. Assume also, in the first instance, that the signals previously supplied to the recording heads 24 and 26 are of a frequency for which there is no instrument input, i. e. a test run, in which event head 26 will have recorded 3,000 cycles per second constantly in channel 59 and head 24 will have recorded 3,500 cycles per second constantly in channel 57. Likewise, head 25 will have recorded 4,000 cycles per second constantly in channel 58. The respective signal frequencies during recording for which there is no instrument input may be termed base frequencies for that channel. Since tape 23 during play-back is moving at the same speed as during recording, it is evident that the magnetic effects in channel 59 will induce a signal into pickup head 63 having a frequency of 3,000 cycles per second. Similarly, pickup head 62 will detect a signal having a frequency of 4,000 cycles per second, and pickup head 61 will detect a signal having a frequency of 3,500 cycles per second.

The signal from pickup head 63 is supplied to a signal converter 81 which comprises suitable amplifiers for amplifying the signal and discriminators for producing a D. C. voltage corresponding to the frequency received which may be supplied to the actuation coil 82 of the graphic recorder. Likewise, the signal detected by pickup head 61 may be supplied to a similar signal converter 83 which produces a D. C. voltage proportional to the frequency, the D. C. voltage being supplied to a second actuating coil 84 of the multi-channel graphic recorder. The signal detected by pickup head 62 is supplied to a signal converter 85 also producing a D. C. voltage proportional to the frequency. From the signal converter 85 a control signal is supplied to the motor power supply 74 and a compensation signal is supplied to all of the signal converters, for example converters 81 and 83.

The signal converters 81 and 83 may be so preset that when they receive the respective base frequencies the output thereof is a normal value which may be zero, and thus no indication is produced on the graphic recorder. Correspondingly, signal converter 85 may be so set that when it receives the base frequency its output is a base or normal value which may be zero, and thus no compensating signal is supplied to signal amplifiers 81 and 83 nor a control signal to the motor power supply 74. In the instance described, the pens of the graphic recorder make the horizontal lines 86 and 87 (Fig. 3) indicating no signal recorded.

Suppose in the instance described that the tape during recording was, and during reproducing is, running at the normal speed of 7½ inches per second, but the signal oscillators 29 and 31 had supplied signals of frequencies respectively above 3,500 cycles per second and above 3,000 cycles per second. In this instance the pickup head 62 detects its base frequency of 4,000 cycles and thus converter 85 supplies normal signals to motor power supply 74 and signal converters 81 and 83. Consequently, no change in speed or compensation is effected. However, pickup head 63 detects a frequency above the base of 3,000 cycles per second for signal converter 81 and thus a D. C. voltage is developed and supplied to coil 82 thereby causing the corresponding pointer to trace a line 88 on record sheet 168 of the graphic recorder which with suitable calibration indicates the tension in link 19 as it varies with time. Likewise, the frequency detected by head 61 is greater than the base value of 3,500 cycles for signal converter 83 and thus a D. C. voltage is developed and supplied to coil 84 causing the cooperating pointer to trace a line 89 which, with proper calibration, indicates acceleration varying with time.

As another form of operation, it may be supposed that, during recording, tape 23 moved faster than normal but at the constant speed of ten inches per second, and signal oscillators 29 and 31 generated their base frequencies of 3,500 cycles per second and 3,000 cycles per second respectively. This situation is illustrated in Fig. 4 wherein the section 94 of the tape has recorded upon it the same information as in Fig. 3 in channels represented by wavy lines 95, 96 and 97 corresponding to pickup heads 61, 62 and 63. In this example of operation, the 4,000 cycles per second of the time base oscillator, the 3,500 cycles per second, and the 3,000 cycles per second of the signal oscillators are spread out over 10 inches.

When tape section 94 strikes pickup heads 61, 62 and 63 (assuming that prior to section 94 the tape had been run at normal speed during recording and thus during reproducing), the pickup heads detect a frequency which, apparently, is less than before because the same number of cycles is spread over a larger distance. Neglecting for the moment the transient signal which the signal converters may receive due to the frequency change, the time base signal converter 85 will produce a D. C. voltage (differing from normal value) inasmuch as the apparent frequency has decreased. This signal is supplied to the motor power supply 74 through conductor 138 thereby causing this apparatus to speed up motor 67. As the speed-up process goes on, the apparent frequency detected increases and approaches the base value, and correspondingly the signal output of converter 85 decreases further. This process continues until the detected frequency is 4,000 cycles per second, at which point the signal output from converter 85 is zero or normal and the motor 67 is driving the tape at the same speed, i. e. 10 inches per second, as it was driven during recording.

Since tape section 94 during play-back is now running at the speed of 10 inches per second, the frequencies detected by heads 61 and 63 are respectively the frequencies during recording of 3,500 cycles per second and 3,000 cycles per second. Accordingly, normal or zero output is produced by signal converters 81 and 83 and the graphic recorder makes the straight lines 98 and 99 on the record sheet 169 of the graphic recorder corresponding to zero test data. While motor 67 is changing from the slower to the higher speed, if no additional compensation were provided, lines 98 and 99 would have irregularities therein which seemingly represent data. This would be an error and is prevented by supplying an appropriate compensation signal from the time base canverter to the signal converters. If, however, during recording, while tape section 94 is running at 10 inches per second, signal oscillators 29 and 31 are supplying data frequencies of above 3,500 cycles per second and above 3,000 cycles per second respectively, magnetic impressions represented by the broken wavy lines 101 and 102 are made. These magnetic impressions having a frequency greater than that represented by wavy lines 97 and 95, the frequencies detected by heads 61 and 63 will be greater than the base values. Hence signal converters 83 and 81 produce an output which is fed to the graphic recorder making the indications represented by lines 103 and 104.

Correspondingly, in another aspect of operation reference is made to Fig. 5 showing a tape section 105 which during recording was run past the recording heads at the constant but slower speed of 5 inches per second. Assuming further that signal oscillators 29 and 31 were generating their base frequencies, i. e. no instrument input, then there is recorded on tape section 105, 3500 cycles in 5 inches represented by wavy line 106, 3,000 cycles in 5 inches represented by wavy line 107, and 4,000 cycles in 5 inches represented by wavy line 108 (the time base channel).

When tape section 105 is being reproduced and the tape has been running at the normal speed of 7½ inches per second, the section wherein the tape was run at 5 inches per second comes opposite pickup heads 61, 62 and 63, the pickup heads detect frequencies greater than the base values in all channels because the same number of cycles is spread over a shorter distance. Neglecting, for the time being, any effects which occur while driving motor 67 is changing speed, signal converter 85 produces a D. C. voltage (differing base value opposite to that for fast tape speed on recording) indicating that the apparent frequency detected is greater than 4,000 cycles. This voltage signal is supplied to motor control means 74 thereby causing motor 67 to slow down. As the motor slows down the detected apparent frequency decreases as does the signal from converter 85 until the apparent frequency detected by head 62 reaches 4,000 cycles per second at which point the signal from converter 85 is normal, and the speed of tape section 105 is 5 inches per second, i. e. the speed during recording.

After tape section 105 is running at the speed of 5 inches per second, the magnetic impressions represented by lines 106 and 107 induce into heads 61 and 63 the base frequencies of 3500 cycles and 3,000 cycles per second whereupon signal converters 81 and 83 produce no output. Hence graphic recorder 22 makes the horizontal line indications 109 and 111 on record sheet 171. If during the recording at 5 inches per second the signal oscillators 39 and 49 are supplying frequencies higher than 3500 cycles and 3,000 cycles per second respectively, as indicated by the broken wavy lines 112 and 113, these higher frequencies will be detected as such during reproducing at 5 inches per second and give the corresponding output of the graphic recorder indicated by lines 114 and 115.

Inasmuch as the same signals are recorded on tape sections 23, 94 and 105, the lines 89, 103 and 114, and the lines 88, 103 and 115 on record sheets 168, 169 and 171 are the same.

*Motor speed control*

For a more complete understanding of the manner in which the tape speed during reproducing is maintained at the same speed as during recording, reference should be had to Figs. 12 and 13 taken in consideration with Figs. 2 and 3.

In Fig. 13 the motor power supply 74 is shown as comprising a series of three tubes 116, 117 and 118 which may be beam power tubes of the 6L6 type with their cathode plate circuits in parallel, the plates being connected to a plus 350 volts D. C. and the cathodes being connected to one brush of motor 67. The other brush thereof being grounded, the three tubes and the armature 71 of motor 67 are connected across the 350 volt supply. The control grids of tubes 116, 117 and 118 are connected together through resistors 121, 122 and 123 and through a conductor 124 to a variable tap on resistor 125 to the plate of a tube 119 which may be of the 6SJ7-GT type. Accordingly, variations in plate potential of tube 119 cause voltage variations in the grids of tubes 116, 117 and 118 which in turn produce corresponding changes in the current supplied to armature 71. The plate potential of tube 119 is controlled through its control grid, voltage of which is controlled as a function of the frequency detected from the time base channel in a manner to be described subsequently in this specification. The screen grids of tubes 116, 117 and 118 are connected together and through a resistor 126 to the 350 volt source. In order that tubes 116, 117 and 118 do not run at excessive temperatures, a resistor 127 is connected in parallel with the cathode plate circuits and thus some of the motor current is supplied therethrough instead of through the tubes.

Figs. 12 and 13 show the time base channel pickup head 62 feeding its signal into and through the following elements, a preamplifier 128, an audio-amplifier 129, a balanced modulator 131, an I. F. amplifier 132, a limiter 133, a discriminator 134, and an output amplifier 135, a local oscillator 136 being associated with the balanced modulator, and a power supply 137 being associated with the circuit as a whole. These elements combined form the time base signal converter 85, one output thereof supplied by conductor 138 to the control grid of tube 119 for effecting speed control of motor 67.

The various elements of time base signal converter 85 perform the functions indicated by their title in a manner generally well understood in this art and a detailed discussion thereof is not believed necessary, the functions to be performed being given only in sufficient detail to indicate the operation.

The pickup head 62 is coupled to the input of preamplifier 128 which may be a double triode 139 of the 6SN7-GT type through a shielded cable 141 in order to prevent the pickup of stray effects since the preamplifier may be spaced some distance away from the pickup head. From the preamplifier the signal passes through the two stages 142 and 143 of the audio-amplifier, which may be pentodes of the 6SK7 type. The output of stage 143 is coupled to the control grids of tubes 144 and 145 of the balanced modulator through a transformer 146, tubes 144 and 145 being of the type 6L7, for example. Through conductor 140, the signal is fed back negatively to the grids of tubes 142 and 143 whereby the signal level to the balanced modulator is substantially constant irrespective of the signal level on the magnetic tape. Supplied to the third or injector grids of tubes 144 and 145 through a conductor 147 and condenser 148 is an intermediate frequency (I. F.) of 455 kilocycles per second, for example, generated by oscillator 136. The 455 kc. frequency is mixed with the input or base frequency of 4,000 cycles per second from pickup head 62 resulting in the output of the balanced modulator having the upper and lower side bands of the I. F., that is, 459 kc. per second and 451 kc. per second, respectively.

The side band frequencies are fed to transformer 149 having a variable primary, then to a transformer 151 having a tuned secondary, and finally to tube 152 forming the first stage of I. F. amplifier 132. The secondary winding of transformer 151 is tuned to the upper side band frequency, that is 459 kc. per second, and thus the lower side band frequency of 451 kc. per second is largely suppressed. From stage 152, which for example may be of the 6SK7 type, the upper side band frequency is fed to a second I. F. transformer 153 having both its primary and secondary windings tuned to the upper side band frequency and thus to tube 154 forming the second stage of the I. F. amplifier, this tube also being of the 6SK7 type. Transformer 153 being tuned to the upper side band, the remaining amplitudes of the lower side band are further suppressed. From stage 154 the upper side band is fed through a third I. F. transformer 155 also having its primary and secondary windings tuned to the upper side band frequency thereby further eliminating the lower side band. From the secondary of I. F. transformer 155, the upper side band is passed to limiter 133 which has two stages 156 and 157, which may comprise tubes of the 6SJ7 type. From the limiter, the output, which has a constant amplitude, is passed to an I. F. transformer 158 having primary and secondary windings 159 and 160 both tuned to the upper side band frequency. The end of winding 159 connected to the plate of tube 157 is connected through a condenser 170 to the midpoint of winding 160. Transformer 158 forms part of the discriminator which includes a double diode rectifier 161 of the 6H6 type. The output of tube 161 taken across the resistors 406 and 407 to ground, as shown, is fed through a resistor 162 to the control grids of an isolating amplifier, which for example may be a double triode 163 of the 6SN7 type, the cathodes thereof being grounded through resistor 208, as shown.

The output of rectifier 161 of the discriminator is a positive or negative D. C. voltage depending upon the frequency supplied to it (Fig. 14). With transformer 158 tuned to 459 kc. per second, the D. C. voltage output of tube 161 is zero when this frequency is supplied inasmuch as the outputs of each half of the tube are equal and opposite. When a higher frequency is supplied, the D. C. voltage output is positive and increases with increasing frequency since the output of one half of the tube exceeds that of the second. Similarly, when a lower frequency is supplied, the D. C. voltage is negative and decreases further with decreasing frequency since the output of the second half of the tube is greater than that of the first. Throughout a greater range of frequencies than needed, the D. C. voltage output of tube 161 is a linear function of the difference between the applied frequency and the resonant frequency of the input transformer.

Amplifier 163 is connected in the form of a cathode follower and the output to motor control circuit 74 is tapped from resistor 164 connected to the cathodes, the amplifier being necessary to isolate the discriminator, that is, to prevent the application of load thereto which may cause its output to vary.

It will be apparent that a discriminator of the character described may be used to produce a direct current voltage varying with applied frequency when an initial frequency of only 4,000 cycles per second is applied to it. However, to improve the transient response of the system, it is found desirable to convert the lower frequency into a higher frequency first by means of a balanced modulator, as has been described.

Considering particularly Fig. 13 and having in mind the problem of maintaining constant the speed of the tape during play-back and equal to that during recording, motor 67 is set to operate at a predetermined speed under the initial conditions when 4,000 cycles is being detected in the time base channel (Figs. 2 and 3). This condition is obtained by adjusting the taps on resistors 164, 125 and 222. The plates of tube 163 are connected together and are connected to a suitable source of D. C. (Fig. 12), for example 150 volts, through conductor 271. The cathodes thereof being grounded through resistor 208, some current flows in the cathode plate circuit even though the signal voltage is zero (i. e. 459 kc. applied to tube 161, or 4,000 cycles detected by head 62) and there is zero bias on the grids. This alone would place the cathodes (point "0") at a potential above ground and since the cathodes are connected by conductor 138 to the grid of tube 119, the voltage above ground thereof would ordinarily indicate a signal for speed change which is incorrect. The cathodes of tube 163 are also connected through resistors 164 and 213 to a suitable source of negative D. C. voltage (Fig. 12), for example —90 volts through conductor 279. At this point the tap on resistor 222 is adjusted to change the grid bias of tube 163 to such a negative value that the cathode voltage of tube 163 is zero (i. e. no current in resistor 208). Now by varying the tap on resistor 164, a wide range of voltage in conductor 138 may be obtained for zero signal on the grids of tube 163 from the discriminator. In one example of operation, voltage of —3.25 is tapped off to conductor 138 for zero signal. Then, when a positive signal voltage is received (frequency above 459 kc.), tube 163 conducts increased current and the voltage of the cathodes rise above zero and the voltage of conductor 138 rises above —3.25 (i. e. to —2.5 for example) which increased voltage is supplied to the grid of tube 119. Correspondingly, when a negative signal voltage is received (frequency less than 459 kc.), tube 163 conducts decreased current and the voltage of the cathodes decreases below zero and the voltage of conductor 138 falls below —3.25 (i. e. —4.0 v.), which decreased voltage is supplied to the grid of tube 119.

The current for the armature 71 flows through tubes 116, 117 and 118 and resistor 127 in parallel, the control grids of the tubes determining the amount of current. In one example of normal operation these control grids operated at about negative 5 or 6 volts which is obtained from tube 119. The cathode of tube 119 is grounded and its plate is connected to a source of D. C. volts (not shown but similar to power sources described), for example 180 volts through a resistor 214, and is also connected to a suitable source of negative D. C. voltage (not shown), for example —150 volts, through resistors 125 and 215. With this connection the plate voltage of tube 119 may have a value around 100 volts positive and the tap on resistor 125 may then be adjusted so as to place the control grids of tubes 116, 117 and 118 at the desired negative volts, for example —5 or —6 volts as noted. Thereafter if the battery voltages change or other changes occur, the resistor 215 may be varied to bring the control grid voltages to the proper value.

Hence in the circuit as shown, when the D. C. output of tube 161 is zero (apparent frequency detected by head 62 is 4,000 cycles per second), in one example of operation, the control grid voltage of tube 119 may be —3.25, the control grid voltage of tubes 116, 117 and 118 may be —5 or —6 volts, and the speed of motor 67 is such as to drive the tape during play-back at the same speed as during recording.

When an increased frequency is being detected, discriminator tube 161 supplies a D. C. voltage greater than zero (Fig. 14), tube 163 supplies a less negative voltage to the grid of tube 119 thereby increasing the current flow therethrough. Since the control grid of tubes 116, 117 and 118 are connected to the plate circuit of tube 119, an increase of current through this tube decreases the voltage applied to the control grids of tubes 116, 117 and 118 since voltage at the plate of a tube goes down as current flow through a plate resistor increases. The current conducted by these tubes decreases and motor 67 accordingly slows down. This is proper inasmuch as a detected frequency greater than the base value indicates that the tape during recording was running slower than base value and thus the tape during play-back must slow down.

Correspondingly, when a lower frequency is detected the output of discriminator is negative (Fig. 14) and tube 163 supplies a more negative voltage to the grid of tube 119 thereby decreasing the current flow therethrough. Consequently, the control grid voltage of tubes 116, 117 and 118 is made less negative, i. e. may be —3 or —4 volts for example, with a corresponding increase in cathode-plate current and an increase in the speed of motor 67. This also is proper since a lower time base channel frequency during play-back indicates that the tape during recording was running faster than base value and thus the tape during play-back must be speeded up.

Relatively small changes in detected frequency produce relatively larger changes in current through the armature of motor 67 inasmuch as the change may be amplified through the use of the tubes. Accordingly, motor 67 may be caused to change its speed rapidly from one value to another.

In the example given, the assumption is that the tape speed during play-back is to be made the same as during recording when the tape speed changes during recording. The apparatus functions as well to maintain the tape speed constant during play-back when the speed change is due to conditions within the play-back apparatus alone, such as voltage changes in battery 73. Such speed changes cause apparent change in time base frequency and correction occurs as described.

Even though indicated differences in detected frequency are large and occur relatively rapidly, motor 67, within limits determined by its inertia, may speed up or slow down rapidly enough to eliminate all errors except those which occur very rapidly, i. e. are of a highly transient character. The small and very rapid fluctuations which occur in tape speed due to the teeth on the driving gears are of such a transient character.

The graphic indications given in Figs. 3, 4 and 5 on tape sections 168, 169 and 171 were made with both motor control and transient compensation present. In the tape sections 165, 166 and 167, it is assumed that the transient response compensation has been eliminated and entire reliance is placed upon the motor speed control. It will be observed that the form of the graphs in tape sections 165, 166 and 167 correspond exactly to those in tape sections 168, 169 and 171 (same recorded data), except that the latter are smooth whereas the former consist of a large number of closely spaced minor fluctuations or ripples, these minor fluctuations being caused by small transients due to the gears of the driving mechanism. The magnitude of the gear teeth transient is small and thus does not distort the overall reading. Large transients may, without compensation, completely distort the readings.

Tape sections 216, 217 and 218 show data curves which may be made without motor speed control or transient compensation. It is to be noted that minor fluctuations are present and the shape of the data curves does not correspond to those of the preceding tape sections, these differences being due to changes in motor speed which may ordinarily occur.

*Transient compensation*

A transient compensating signal is transmitted from time base converter 85 to signal converters 81 and 83 (Figs. 1, 2 and 3) through conductor 209, and the manner of compensating for transients, together with the manner of signal reproduction, may best be understood by referring to Figs. 10 and 11 which, when considered together, comprise signal converter 81 and the graphic recorder 82. The circuit of Figs. 10 and 11 is quite similar to that of Figs. 12 and 13, but differs therefrom in certain respects to be more particularly pointed out.

Thus signal converter 81 may comprise a preamplifier 181, an audio-amplifier 182, a balanced modulator 183, an I. F. amplifier 184, a limiter 185, a discriminator 186, a power supply 187, and a compensation control circuit 188. A D. C. amplifier 189 is shown connected between the output of discriminator 186 and the coil of the pen or graphic recorder 82. Amplifier 189 may be of any well known type supplying sufficient current to operate the pen and it is not believed necessary to describe it in any detail.

Preamplifier 181 comprises a double triode 189, one of whose grids receives the input signal from pickup head 63, the output of the preamplifier being fed from the second triode section connected as a cathode follower to the first stage 191 of the audio-amplifier, and from the second stage 192 thereof the signal is fed through a transformer to a pair of tubes 193 and 194 of balanced modulator 183. The intermediate frequency (I. F.) of 455 kc. per second is fed into the balanced modulator through a conductor 195 and a condenser 196, this frequency being supplied from oscillator 136 (Fig. 12) through a conductor 197. The upper and lower side bands produced by the balanced modulator are fed through a transformer 198 to a transformer 199 whose secondary is tuned to the upper side band frequency of 458 kc. per second. The base frequency of the signal converter of head 63 is 3,000 cycles per second.

I. F. amplifier 184 comprises two stages 201 and 202 coupled by a transformer 203 having its primary and secondary windings tuned to the upper side band frequency. The output of stage 202 is fed through a transformer 204 having its primary and secondary windings tuned to the upper side band frequency to the input of limiter 185. The preamplifier, audio-amplifier, the balanced modulator, and I. F. amplifier are similar to those described in connection with Fig. 12, and are connected in substantially the same fashion. Accordingly, the signal received by limiter 185 is the upper side band frequency equal to the input frequency plus the intermediate frequency of 455 kc. per second.

Limiter 185 is a unit comprising two tubes 219 and 221 of the 6SJ7 type and are connected as shown. The limiter produces a substantially constant signal which is coupled to the tube 205 of discriminator 186 through a transformer 206 having its primary and secondary windings tuned to the local oscillator frequency of 455 kc.

Discriminator 186 is similar to discriminator 134, is connected in substantially the same manner, but its normal operation is not at the resonant frequency or zero output signal. The output of discriminator 186 is fed through a resistor 207 to amplifier 189.

Transformer 206 being tuned to 455 kc. per second, the output of the discriminator, when properly adjusted, will be zero at this frequency and the transformer connections are such that for frequencies above 455 kc. per second the D. C. voltage is negative and for frequencies less than 455 kc. the D. C. voltage is positive (Fig. 15).

The normal frequency (no data signal) received by discriminator 186 is 458 kc. per second, i. e. the local oscillator frequency plus the base frequency of 3,000 cycles per second in the data channel. Consequently the output of the discriminator normally is a negative voltage of some value taken across resistors 226 and 227, i. e. the discriminator operates at some point *a* on its characteristic curve *b* (Fig. 15). In one example of operation this voltage is —1.2 volts D. C. Since this represents the condition of no data, the pen recorder should not deflect, i. e., the amplifier 189 should not produce a signal. Preferably this initial condition of the signal input to the amplifier is zero. This zero signal is produced by providing a positive voltage equal to the initial negative voltage of the discriminator and opposing them. Thus the lower end of the resistor 227 is connected through conductor 228 to a variable tap on resistor 229 which is connected to a source of positive D. C. voltage (power supply 187, Fig. 10) through conductor 231 and resistor 232.

The output of discriminator tube 205 is a negative D. C. voltage, more or less negative, depending upon whether the frequency detected in the signal or data channel is greater or lesser than 3,000 cycles per second, the pen recorder being operated in accordance with the signal received. In one condition of operation, the maximum data as is represented by a frequency of 4,000 cycles per second in the signal channel and the output of the discriminator is —1.6 volts. The pen recorder, for example, has no deflection if 3,000 cycles is received and may have positive deflection if a greater frequency is received and a negative deflection if a lesser frequency is received. If the tape during play-back is running at the same speed as the tape during recording, the pen recorder will produce indications depending upon the frequency of the signal on the tape which is a function of the recorded data; that is, the pen recorder deflections are proportional to the variation from 3,000 cycles per second of the signal frequency. That is, the discriminator output follows curve $b$ on each side of point $a$. Thus, if the tape speed during reproducing is the same as during recording, the circuit of Figs. 10 and 11 functions substantially in the same manner as the circuit of Figs. 12 and 13 already described.

Bearing in mind that the armature of motor 67 (Fig. 13) cannot change speed infinitely fast because of its inertia, highly transient data will not be accurately recorded inasmuch as the motor cannot change the speed of the tape fast enough to maintain the apparent or detected frequency equal to the recorded frequency in the time base channel and consequently the frequencies received by the signal converters would be in error. Discriminators 134 and 186, however, react very rapidly to changes in applied signals inasmuch as these are electronic devices and thus have negligible equivalent inertia. Discriminator 186 detects changes in frequency also detected by discriminator 134 in the time base channel substantially at the instant of occurrence. A signal derived from this detection is, of course, supplied to the motor control circuit as described for changing the motor speed. A second signal derived from this detection may also be used to compensate the setting of limiter 185 to either increase or decrease the amplitude of the signal supplied to discriminator 186 and thereby cause this unit to produce an increased or decreased output signal.

That is to say, ordinarily discriminator 186 receives a constant signal amplitude from limiter 185, this amplitude having been predetermined in order to produce the desired discriminator characteristic curve $b$ (Fig. 15).

The constant output signal level from the limiter is obtained by operating the tubes 219 and 221 considerably beyond saturation. In one example of operation, the operating plate voltage of tube 219, supplied from source 187 of 150 volts through conductors 225 and 236 and resistor 237 is approximately 45 volts, the control grid voltage developed by grid current flowing through resistors 244 and 245 is —22 volts, and the screen grid voltage supplied from source 187 through a resistor 247 is approximately 45 volts, the plate voltage of tube 221, supplied from source 187 through conductors 225, 236, and 238, the voltage divider resistors 239 and 241, and conductors 242 and 243, is approximately 21 volts, the control grid voltage developed by grid current flowing through resistor 246 is —7.5 volts, and the screen grid (248) voltage is 8.5 volts.

Changing the signal level from limiter 185 changes the characteristic of discriminator 186 which, combined with the fact that the normal output of the discriminator is a negative D. C. voltage, provides the transient compensation. Increasing the signal level input shifts the discriminator characteristic to curve $c$ and decreasing the signal level shifts the characteristic to curve $d$. Accordingly, if at the instant a change in detected frequency occurs a signal proportional to the detected change is supplied the limiter 185, the output of discriminator 186 changes accordingly substantially instantaneously and before the armature of motor 67 has had an opportunity to change its speed. The circuit constants may be so selected that the output of the discriminator changes by the same percentage as the percentage change in detected frequency, that is, the percentage change in tape speed.

The change in the limiter signal level is accomplished by changing the screen grid voltage of tube 221 substantially as follows: Referring to Fig. 13, a second signal from output amplifier 135 is taken from cathode follower resistor 208 through conductor 209 to the control grid of tube 211 forming part of the compensation control circuit 199 of Fig. 11. Tube 211 is a pentode of the 6F6 type whose control grid taps off of a resistor 212 connected to conductor 209 and ground. The plate of tube 211 is connected through conductor 213 to the screen grid 248 of the second stage of limiter 185 so that changes in the plate voltage of tube 211 cause corresponding changes in the voltage on screen grid 248.

Plate voltage is supplied to tube 211 from power supply 187 through conductor 225, resistor 224, a variable tap on resistor 223, and a resistor 233 to ground. The plate supply being 150 volts, for example, the initial plate voltage of tube 211 is about 8.5 volts when the control grid voltage is zero, and the screen grid voltage is approximately 43 volts provided by connecting the screen grid through a voltage divider consisting of resistors 234 and 235, respectively, to the source of supply through conductor 225. Normally (4,000 cycles detected in the time base channel) the control grid of tube 211 is at zero volts since the cathodes of tube 163 are at zero volts. For this condition, the screen grid 248 of tube 221 is at 8.5 volts and the output signal amplitube thereof is such as to cause discriminator to operate on curve $b$ (i. e. at 3,000 cycles detected in a data channel discriminator voltage is —1.2).

Whenever a signal is received by the control grid of tube 211 through conductor 209, the plate voltage thereof changes instantly and causes a change in the voltage of screen grid 248 and thus in the output signal of tube 221. Consequently, when a change in frequency is detected in the time base channel, a corresponding signal is immediately transmitted to limiter 185 and discriminator 186 has its input signal compensated. Correspondingly, its output signal is compensated before the motor 67 has had an opportunity to change its speed. The functioning of the circuits described is very rapid since the time constants thereof are small and accordingly high frequency transients, as well as very small high frequency ripples such as are caused by the gears in the recording apparatus or in the reproducing apparatus, are eliminated from the final indication, as may be seen by comparing tape sections 165, 166, and 167 with tape sections 168, 169, and 171.

The functioning of the compensation circuit may best be understood by considering an example. Suppose that during a parachute drop test the tape speed during recording is decreased by a substantial amount due to the parachute opening shock. The motor 67 during reproducing is unable instantaneously to reproduce this decrease in speed irrespective of how large a decrease in voltage is applied thereto. However, the motor makes an effort to decrease its speed and will do so if the transient exists for a relatively long time. However, in the interim the presence of a transient signal is indicated by a rapid increase in the apparent frequency detected in the time base channel which produces instantaneously a rise in the cathode voltage of tube 163, as has been described in connection with motor speed compensation.

A portion of this rise in voltage is transmitted to the control grid of tube 211.

The rise in grid voltage of tube 211 increases the plate current thereof which, flowing through resistors 223 and 224, decreases the plate voltage and consequently decreases the voltage of screen grid 248. Decreasing the voltage of screen grid 248 decreases the output signal level so that discriminator 186 shifts to curve $d$ (Fig. 15). Prior to the receipt of the transient signal, this discriminator operated on curve $b$ and assuming that no other data was being received, i. e. the frequency in the data channel is 3,000 cycles per second, the discriminator was operating at point $a$.

The increase detected in the apparent frequency in the time base channel due to the sudden slowing down of the tape during recording is also detected in the data channels and causes the negative voltage of discriminator 186 (across resistors 226 and 227) to increase in amplitude negatively, i. e. from point $a$ to point $e$. This change is proportional to the change in detected frequency or difference in tape speed from that during recording.

The increase in negative amplitude due to the increase in detected frequency and the decrease in negative amplitude, as shown by shifting to characteristic curve $d$, combine so that the output of discriminator is at point $f$. The circuit constants may be so chosen that the decrease in discriminator output from $e$ to $f$ just equals the increase from $a$ to $e$. The circuit constants having been so chosen, a transient change in detected frequency is compensated at the instant it occurs. The discriminator output still being $-1.2$ volts, the pen recorder makes no deflection.

If the transient is one of tape speed-up during recording, the reverse takes place. This effects a sudden decrease in apparent frequency with a change of output of discriminator 186 from point $a$ to point $g$ on curve $b$. Simultaneously, the voltage from tube 163 (point $o$) decreases and decreases the control grid voltage of tube 211 which causes a decrease in plate current and an increase in plate voltage. This increases the voltage of screen grid 248 and increases (negatively) the signal level of the discriminator, i. e. shifts the operating characteristic from curve $b$ to curve $c$ and to a new operating point $h$. With proper constants, previously chosen, the point $h$ represents the same discriminator output as point $a$.

The foregoing description has been with reference to the case of zero data being recorded and reproduced. When data are being recorded, the output of discriminator 186 corresponds to different points along curve $b$ depending on the frequency received (i. e. the data). If, while at some other point on curve $b$, a transient occurs the foregoing described operation will occur around that point.

Tubes 219 and 221 of limiter 185, and tube 211 of the compensation circuit are operated at somewhat unusual voltages, this having been found necessary to produce the desired percentagewise correction in discriminator output. The various tube characteristics and the circuits are not completely linear in response with varying frequencies. These factors may require some adjusting of circuit constants to produce a satisfactory final circuit, such adjusting being within the ordinary skill of this art.

The transient may be of a very short duration, in which event it may have come and gone before the motor has had an opportunity to change speed and the compensating circuit causes correct data reproduction. If the transient is one which begins rapidly and continues, then the compensation control circuit described will compensate the output during the interim that the motor is changing its speed. As motor 67 changes its speed, the frequency detected from the time base channel changes and thus the signal supplied to the compensation control circuit and hence to limiter 185 changes. Accordingly, when motor 67 has reached the proper speed, the signal transmitted by the compensation control circuit to limiter 185 will be zero.

While only the signal converter associated with head 63 has been described, it will be understood that signal converter 83 associated with head 61 as well as others may be similarly constructed and adjusted as described to produce the desired indications.

The local oscillator 136 (Fig. 12) supplying the intermediate frequency (I. F.) to the time base channel and the converter channels is of the resistance capacity type comprising a double triode 249 of the type 6SN7 utilizing a crystal 251 for determining the frequency of 455 kc. per second, and an isolating amplifier 252 which may be of the type 6SK7. The plate of tube 252 is coupled through a transformer 253 having a primary tuned to 455 kc. per second and a secondary of low impedance (for example only twenty turns having a voltage of the order of 3 to 5 volts) so as to match the plate impedance of tube 252 to the impedance of line 197 supplying the converter channels.

In the construction of the various channels, the signal converters may be mounted in separate chassis necessitating a line 197 which may be a shielded cable, as shown. The input impedance of the injector grids of the various balanced modulators being high, as compared with the impedance of line 197, the various converter channels may be connected to line 197 or removed as desired without affecting the I. F. voltage to the remaining channels.

Plate voltage is supplied to tubes 252 and 249 from power supply 137 through conductor 254 and a filter comprising a condenser 255, and a choke coil 256 from a regulating tube 257 which may be of the type VR150 supplying a regulated voltage to conductor 254 of 150 volts D. C.

Power supply 137 comprises a transformer 258 supplied with alternating voltage, for example 110 volts, and whose secondaries are connected as shown to rectifier tubes 259 and 261 respectively, of the types 5U4-G and 6X5. Tube 259 is connected as a full wave rectifier and the A. C. voltage is supplied by the transformer across the rectifier, the regulating tubes 262, 257, and 263 of type VR150 and resistors 264, 265 and 266 respectively, a filter circuit consisting of a choke 267 and two condensers 268 and 269 serving to remove ripple. Each of tubes 262, 257 and 263 maintains a voltage of plus 150 volts D. C. from plate to ground, tube 262 supplying voltage through conductor 270 to the plates and screen grids of the balanced modulator (131) tubes and of the I. F. amplifier (132) tubes as shown. Likewise tube 263 supplies voltage through conductor 271 to the plates and screen grids of the limiter (133) tubes and plate voltage to output amplifier (135) tube. Voltage is supplied from rectifier 259 through conductors 272 and 273 to the plates and screen grids of audio-amplifier (129) tubes.

Tube 261 is connected as a half-wave rectifier inversely so that a negative D. C. voltage is obtained and the A. C. voltage is supplied across tube 261, resistor 274, and voltage regulating tube 275 of the type VR90, a filter consisting of a choke 276 and two condensers 277 and 278 serving to reduce ripple. Tube 275 produces a regulated voltage of $-90$ volts D. C. which is supplied through conductor 279 and resistors as shown to the cathodes of tube 163 and to the grids thereof.

The A. C. voltage from the left hand plate of tube 259 to ground through part of the transformer may be about 400 volts, while the A. C. voltage from the right hand plate and the cathode of tube 261 to ground through the other part of the transformer may be about 500 volts, this difference arising since the latter part of the transformer is supplying two loads.

The 250 volts D. C. connected to the plates of preamplifier (128) tubes and the 350 volts D. C. connected to the plates of tubes 116, 117 and 118 of motor supply 74 (Fig. 13) are provided from sources, not shown, but which may be similar to the power sources already described.

Power supply 187 (Fig. 10) comprises a transformer 281, a full wave rectifier 282 of the type 5U4G, a filter circuit comprising a choke 283, and two condensers 284 and 285, and two voltage regulating tubes 286 and 287 which may be of the type VR150 connected as shown. The output of the filter circuit is connected through conductor 288 and resistors 289 and 291 to tubes 286 and 287, respectively, whose cathodes are connected through conductor 292 to the midpoint of one transformer secondary. Conductor 293 is regulated to 150 volts D. C. and supplies voltage as shown to the plates and screen grids of the tubes of the balanced modulator 183 and I. F. amplifier 184. Likewise, conductor 225 is regulated to 150 volts D. C. and supplies voltage to various tubes of Fig. 11, as already described.

The A. C. voltage from plate to ground of tube 282 may be 580 volts, and conductor 288 is connected through conductor 294 to the plates and screen grids of the tubes of audio-amplifier 182.

The 250 volts D. C. connected to the plates of tube 189 of preamplifier 181 is obtained from a source not shown, which may be similar to the power supplies already described.

While shown together in Figs. 10, 11 and 12, 13, in one embodiment of the apparatus constructed, the play-back heads were mounted with the preamplifiers in one location while the time base and signal converters were constructed as separate units, excluding the preamplifiers and mounted in a different location. To decrease the pickup of stray signals, the preamplifiers were associated directly with the play-back heads to increase the signal level. The output of the preamplifiers was then passed to the audio-amplifiers by means of the shielded cables 295 and 296 (Figs. 12 and 10, respectively). In constructions where the play-back heads are in close association with the time base and signal converters, the preamplifiers may be eliminated and suitable connections made to the audio-amplifiers in accordance with the general understanding in this art.

*Description of oscillators (Figs. 7, 8, 9)*

Fig. 7 discloses a Wien bridge type oscillator which is of the resistance capacity type generating a constant voltage of 4,000 cycles per second. This circuit is a generally well understood one and a detailed explanation is not believed necessary. The frequency of the oscillator is determined by the constants of the bridge network comprising resistors 454, 455, 456 and 457 and the condensers 458, 459, 461, 462, 463 and 464, connected as shown.

The output of the bridge across points 465 and 466 is applied across the triode 467, which may be of the type 9002, operating as a buffer or isolating amplifier to prevent subsequent elements from applying load to the bridge circuit. The plate of tube 467 is connected to the grid of an amplifier triode 468 of the type 9002, the plate of which is connected in feedback circuit relation by conductor 469 and condenser 471 to one corner of the bridge, the opposite corner thereof being connected to the cathode of tube 468 through conductor 470 and resistor 498 to complete the feedback circuit.

The plate of tube 468 is connected through condenser 472 to the grid of amplifier tube 473 of the type 9002 and the output of the bridge is taken through condenser 474, conductor 475 and shielded cable 476 to head 25.

The plate voltages of tubes 467, 468 and 473 are, respectively, 65, 35 and 60 volts D. C. in one form of operation and the control grid voltages are 0, 0, and —.45 volts D. C., respectively.

Fig. 8 discloses an oscillator of the resistance capacity or multivibrator type generating a frequency varying from 3,500 cycles per second to 3,000 or 4,000 cycles per second, depending on the variations of condenser 48.

Tubes 477 and 478 of the 6C5 type are connected as multivibrator 47, plate voltage being supplied from a battery 479 of 45 volts. The multivibrator output is fed to a buffer or isolation amplifier 49 comprising a tube 481 of the 9002 type having a plate voltage of 77 volts in one form of operation. The control grid voltage is —.87. The plates of tubes 477 and 478 have voltages of 41 and 26.5 with respect to the battery negative, and the control grids have voltages of —.45 and —.37 relative thereto. The A. C. output is taken from tube 481 through a shielded cable 482 to head 24 as shown.

Fig. 9 discloses a combination of a bridge 53, a balanced D. C. amplifier 52, a resistance capacity oscillator 51, and a buffer amplifier 54. Bridge 53 may comprise a series of arms 480, 483, 484 and 485 connected as shown and forming part of link 19 between the gondola and the parachute, arms 483 and 485 being resistances varying with tension. Normally this bridge is balanced and produces no voltage across conductors 486 and 487. Hence amplifier 52 supplies a signal to oscillator 51 so that the base or 3,000 cycles per second is generated. When tension is placed across bridge 53 it becomes unbalanced, a voltage develops across conductors 486 and 487, and amplifier 52 supplies a signal to oscillator 51 which generates a frequency in proportion to the tension across the bridge.

Balanced D. C. amplifier 52 comprises a pair of tubes 488 and 489 of the type 6C5 connected as shown. A balanced amplifier is used since it is desired to provide more stable operation. The plate voltages of tubes 488 and 489 are 18 and 19 volts D. C. respectively, and the control grid voltages are .85 and .75 volts D. C. respectively, in one example of operation. The output of the balanced amplifier is fed to the R. C. oscillator through conductor 491.

The R. C. oscillator comprises a pair of tubes 492 and 493 of the type 6C5 connected as shown and having a plate supply of 22.5 volts, the operating voltage at the plate being 20.5 volts respectively.

The output of the oscillator is fed to the control grid of buffer amplifier tube 490, which may be a pentode of type 6AK5, through conductor 493. The plate supply of tube 490 is +90 volts D. C. giving a plate and screen grids voltages of 58 volts and 56 volts respectively, the control grid bias being —.55 volts D. C.

The final output is taken from the plate of tube 492 through condenser 494 and shielded cable 495 to head 26.

While the generators 29, 31 and 32 have been shown in one form, it will be understood that other forms may be used, for example L. C. oscillators, so long as an A. C. signal proportional to the data signal is obtained.

Plate voltage to the various units is supplied from batteries since there is no A. C. available in the gondola, but where A. C. is available other forms of power sources may be used.

TABLES OF CIRCUIT CONSTANTS AND VALUES

*Fig. 7*

[Resistors and resistance values in ohms, K=1,000; M=1,000,000]

| Res. | Ohms | Res. | Ohms | Res. | Ohms | Res. | Ohms |
|---|---|---|---|---|---|---|---|
| 454 | 1,275 | 457 | 100K | 498 | 2.2K | 502 | 680K |
| 455 | 4K | 496 | 47K | 499 | 100K | 503 | 22K |
| 456 | 100K | 497 | 470K | 501 | 68K | | |

[Condensers and capacity values in farads, $\mu=10^{-6}$]

| Cond. | Farads | Cond. | Farads | Cond. | Farads | Cond. | Farads |
|---|---|---|---|---|---|---|---|
| 458 | 10–50$\mu\mu$ | 462 | 10–50$\mu\mu$ | 471 | .10$\mu$ | 504 | .01$\mu$ |
| 459 | 300$\mu\mu$ | 463 | 300$\mu\mu$ | 472 | .0015$\mu$ | 505 | 1$\mu$ |
| 461 | 25$\mu\mu$ | 464 | 25$\mu\mu$ | 474 | .01$\mu$ | 506 | .008$\mu$ |

Fig. 8

[Resistors and resistance values in ohms, K=1,000; M=1,000,000]

| Res. | Ohms | Res. | Ohms | Res. | Ohms | Res. | Ohms |
|---|---|---|---|---|---|---|---|
| 507 | 2.5K | 509 | 175K | 512 | 400K | 514 | 2M |
| 508 | 50K | 511 | 75K | 513 | 70K | 515 | 27K |

[Condensers and capacity values in farads, $\mu=10^{-6}$]

| Cond. | Farads | Cond. | Farads | Cond. | Farads |
|---|---|---|---|---|---|
| 48 | var. | 518 | .001$\mu$ | 522 | .01$\mu$ |
| 516 | .001$\mu$ | 521 | 200$\mu\mu$ | 523 | .01$\mu$ |

Fig. 9

[Resistors and resistance values in ohms, K=1,000; M=1,000,000]

| Res. | Ohms | Res. | Ohms | Res. | Ohms | Res. | Ohms |
|---|---|---|---|---|---|---|---|
| 483 | 2K | 527 | 5K | 533 | 2.5K | 538 | 22K |
| 485 | 2K | 528 | 2K | 534 | 500K | 539 | 68K |
| 524 | 100K | 529 | 2.5K | 535 | 500K | | |
| 525 | 100K | 531 | 2.5K | 536 | 1M | | |
| 526 | 2K | 532 | 2.5K | 537 | 500K | | |

[Condensers and capacity values in farads, $\mu=10^{-6}$]

| Cond. | Farads | Cond. | Farads | Cond. | Farads | Cond. | Farads |
|---|---|---|---|---|---|---|---|
| 541 | .002$\mu$ | 544 | .005$\mu$ | 547 | .003$\mu$ | 551 | .5$\mu$ |
| 542 | .5$\mu$ | 545 | 400$\mu\mu$ | 548 | 25$\mu$ | 552 | .01$\mu$ |
| 543 | .5$\mu$ | 546 | 400$\mu\mu$ | 549 | .01$\mu$ | 553 | .006$\mu$ |

Figs. 10 and 11

[Resistors and resistance values in ohms, K=1,000; M=1,000,000]

| Res. | Ohms | Res. | Ohms | Res. | Ohms | Res. | Ohms |
|---|---|---|---|---|---|---|---|
| 207 | 150K | 241 | 3.3K | 304 | 100K | 317 | 1.5K |
| 212 | 20K | 244 | 2.2M | 305 | 470K | 318 | 1K |
| 223 | 20K | 245 | 470K | 306 | 100K | 319 | 270K |
| 224 | 33K | 246 | 100K | 307 | 4.7K | 321 | 270K |
| 226 | 100K | 247 | 680K | 308 | 100K | 322 | 470 |
| 227 | 100K | 289 | 4.5K | 309 | 470 | 323 | 47K |
| 229 | 10K | 291 | 4.5K | 310 | 680K | 324 | 270K |
| 232 | 330K | 297 | 10K | 311 | 47K | 325 | 470K |
| 233 | 10K | 298 | 470K | 312 | 47K | 326 | 47K |
| 234 | 10K | 299 | 470K | 313 | 470K | 327 | 1K |
| 235 | 18K | 301 | 2.2K | 314 | 500K | 328 | 470 |
| 237 | 220K | 302 | 560K | 315 | 47K | 329 | 100K |
| 239 | 18K | 303 | 320K | 316 | 1.5K | 331 | 10K |

[Condensers and capacity values in farads, $\mu=10^{-6}$]

| Cond. | Farads | Cond. | Farads | Cond. | Farads | Cond. | Farads |
|---|---|---|---|---|---|---|---|
| 196 | 500$\mu\mu$ | 338 | 8$\mu$ | 347 | .01$\mu$ | 356 | .1$\mu$ |
| 284 | 8$\mu$ | 339 | .01$\mu$ | 348 | 10$\mu\mu$ | 357 | 75$\mu\mu$ |
| 285 | 8$\mu$ | 340 | .05$\mu$ | 349 | .01$\mu$ | 358 | 500$\mu\mu$ |
| 332 | .1$\mu$ | 341 | 5$\mu$ | 351 | .1$\mu$ | 359 | .1$\mu$ |
| 333 | .008$\mu$ | 342 | .003$\mu$ | 352 | .01$\mu$ | 361 | 500$\mu\mu$ |
| 334 | .1$\mu$ | 343 | .01$\mu$ | 353 | 10$\mu\mu$ | 362 | 500$\mu\mu$ |
| 335 | .01$\mu$ | 344 | .05$\mu$ | 354 | 250$\mu\mu$ | 363 | .1$\mu\mu$ |
| 336 | .003$\mu$ | 345 | .1$\mu$ | 355 | 10$\mu$ | 364 | .002$\mu$ |
| 337 | .01$\mu$ | 346 | .01$\mu$ | | | | |

| Coil | Inductance |
|---|---|
| 283 | 10 henries. |

Figs. 12 and 13

[Resistors and resistance values in ohms, K=1,000; M=1,000,000]

| Res. | Ohms | Res. | Ohms | Res. | Ohms | Res. | Ohms |
|---|---|---|---|---|---|---|---|
| 121 | 100 | 368 | 2.2K | 386 | 10K | 404 | 6.8K |
| 122 | 100 | 369 | 560 | 387 | 1K | 405 | 100K |
| 123 | 100 | 371 | 320K | 388 | 270K | 406 | 100K |
| 125 | 500K | 372 | 100K | 389 | 270K | 407 | 100K |
| 126 | 4.5K | 373 | 470K | 391 | 470$\mu$ | 408 | 120K |
| 127 | 1.5K | 374 | 100K | 392 | 47K | 409 | 6.8K |
| 162 | 2.2M | 375 | 100K | 393 | 1K | 411 | 6.8K |
| 164 | 470 | 376 | 470K | 394 | 270K | 412 | 100K |
| 208 | 1K | 377 | 47K | 395 | 470$\mu$ | 413 | 1.2M |
| 213 | 10K | 378 | 680K | 396 | 47K | 414 | 4.7K |
| 214 | 150K | 379 | 270 | 397 | 680K | 415 | 4.7K |
| 215 | 50K | 381 | 5.6K | 398 | 2.2M | 416 | 270K |
| 222 | 10K | 382 | 47K | 399 | 270K | 417 | 270K |
| 365 | 10K | 383 | 47K | 401 | 100K | 418 | 1K |
| 366 | 470K | 384 | 1.5K | 402 | 100K | 419 | 100K |
| 367 | 470K | 385 | 1.5K | 403 | 20K | 421 | 1.8K |

[Condensers and capacity values in farads, $\mu=10^{-6}$]

| Cond. | Farads | Cond. | Farads | Cond. | Farads | Cond. | Farads |
|---|---|---|---|---|---|---|---|
| 148 | 75$\mu\mu$ | 430 | 8$\mu$ | 439 | .1$\mu$ | 446 | 100$\mu\mu$ |
| 422 | .1$\mu$ | 431 | .01$\mu$ | 440 | .01$\mu$ | 447 | 100$\mu\mu$ |
| 423 | .01$\mu$ | 432 | .1$\mu$ | 441 | 10$\mu\mu$ | 448 | .1$\mu$ |
| 424 | .008$\mu$ | 433 | .05$\mu$ | 442 | 75$\mu\mu$ | 449 | 250$\mu\mu$ |
| 425 | .1$\mu$ | 434 | .05$\mu$ | 443 | 10$\mu\mu$ | 450 | .01$\mu$ |
| 426 | .003$\mu$ | 435 | .1$\mu$ | 444 | 75$\mu\mu$ | 451 | 40$\mu\mu$ |
| 427 | .01$\mu$ | 436 | 10$\mu\mu$ | 445 | .01$\mu$ | 452 | 75$\mu\mu$ |
| 428 | .01$\mu$ | 437 | .01$\mu$ | | | 453 | 250$\mu\mu$ |
| 429 | .5$\mu$ | 438 | .01$\mu$ | | | | |

| Coils | Inductance |
|---|---|
| 256 | 2.5 millihenries. |
| 267 | 12 henries. |
| 276 | 10 henries. |

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for reproducing information previously recorded in the form of spaced signals on an elongated medium wherein a characteristic of the signals corresponds to said information and wherein said medium includes a second set of spaced signals made by a recurring signal whose frequency of recurrence was constant during recording comprising, a pair of reproducing heads cooperating respectively with said information signals and said second signals, means for moving said medium past said reproducing heads, means connected to said information reproducing head for converting the said characteristic of the signals into the information, means responsive to the frequency of said second set of signals to maintain the speed of said medium substantially equal to that during recording, and further means responsive to the frequency of said second set of signals for compensating said reproduced information.

2. Apparatus for reproducing information previously recorded in the form of a first series of magnetic effects on an elongated magnetic medium, the frequency of said effects corresponding to said information, said medium also including a second series of magnetic effects the frequency of which corresponds to the speed during recording comprising, a pair of reproducing heads for cooperation respectively with said first and second series of magnetic effects, motor means for moving said medium past said reproducing heads, frequency conversion means connected to the head associated with said first series of magnetic effects for converting the frequency of said first series of magnetic effects into said information as said medium moves during reproducing, means responsive to the frequency of said second set of magnetic effects for controlling said motor means to move said medium during reproducing at a speed substantially equal to that during recording, and further means responsive to the frequency of that second set of magnetic effects for compensating said reproduced information.

3. Apparatus for reproducing information previously recorded in the form of a first series of magnetic effects on an elongated magnetic medium, the frequency of said effects corresponding to said information, said medium also including a second series of magnetic effects the frequency of which corresponds to the speed during recording comprising, a pair of reproducing heads for cooperation respectively with said first and second series of magnetic effects, motor means for moving said medium past said reproducing heads, frequency conversion means connected to the head associated with said first series of magnetic effects for converting the frequency of said first series of magnetic effects into said information as said medium moves during reproducing, and means responsive to the frequency of said second set of magnetic effects for controlling said motor means to move said medium during reproducing at a speed substantially equal to that during recording.

4. Apparatus for reproducing information previously recorded in the form of a first series of magnetic effects on an elongated magnetic medium, the frequency of said effects corresponding to said information, said medium also including a second series of magnetic effects the frequency of which corresponds to the speed during recording comprising, a pair of reproducing heads for cooperation respectively with said first and second series of magnetic effects, motor means for moving said medium past said reproducing heads, frequency conversion means connected to the head associated with said first series of magnetic effects for converting the frequency of said first series of magnetic effects into said information as said medium moves during reproducing, and means responsive to the frequency of said second set of magnetic effects during reproducing for compensating said reproduced information for errors resulting from undesired speed variations of said medium.

5. Apparatus for reproducing information previously recorded in the form of a first series of spaced signals on an elongated medium, the recording frequency of which signals corresponds to such information, said medium also including a second series of spaced signals the frequency of which corresponds to the speed during recording comprising, a pair of detecting means for cooperation respectively with said first and second series of signals, motor means for moving said medium past said detecting means, frequency conversion means associated with the one of said pair of detecting means cooperating with said first series of signals for converting the frequency of said first series of signals into said information as said medium moves during reproducing, and means responsive to the frequency of said second set of signals during reproducing for compensating said reproduced information for errors resulting from undesired speed variations of said medium.

6. Apparatus for reproducing information previously recorded in the form of spaced signals on an elongated medium wherein the frequency of the signals corresponds to said information and wherein said medium includes a second set of spaced signals made by a recurring signal whose frequency of recurrence was constant during recording comprising reproducing means cooperating with said information signals and said second signals, means for moving said medium past said reproducing means, frequency conversion means connected to said reproducing means for converting the said frequency of the information signals into such information as said medium moves during reproducing, means responsive to the frequency of said second set of signals during reproducing to maintain the speed of said medium substantially equal to that during recording, and further means responsive to the frequency of said second set of signals for compensating said reproduced information for variations in reproducing speed.

7. Apparatus for reproducing information previously recorded in the form of spaced signals on an elongated medium wherein the frequency of the signals corresponds to said information and wherein said medium includes a second set of spaced signals made by a recurring signal whose frequency of recurrence was constant during recording comprising reproducing means cooperating with said information signals and said second signals, means for moving said medium past said reproducing means, frequency conversion means connected to said reproducing means for converting the said characteristic of the information signals into such information, and further means responsive to the frequency of said second set of signals for compensating said reproduced information.

8. Apparatus for reproducing information previously recorded in the form of a first series of magnetic effects on an elongated medium, the frequency of said effects corresponding to said information, said medium also including a second series of magnetic effects the frequency of which corresponds to the speed during recording comprising, a reproducing means for cooperation with said first and second series of magnetic effects, frequency conversion means connected to the reproducing means for converting the frequency of said first series of magnetic effects into said information as said medium moves during reproducing, and means responsive to the frequency of said second set of magnetic effects during reproducing for compensating said reproduced information for errors resulting from undesired speed variations of said medium.

References Cited in the file of this patent

UNITED STATES PATENTS

| | | |
|---|---|---|
| 2,113,226 | Young | Apr. 5, 1938 |
| 2,334,510 | Roberts | Nov. 16, 1943 |
| 2,354,086 | MacKay | July 18, 1944 |
| 2,378,383 | Arndt, Jr. | June 19, 1945 |
| 2,378,388 | Begun | June 19, 1945 |
| 2,378,389 | Begun | June 19, 1945 |
| 2,394,990 | Eisler et al. | Oct. 30, 1945 |
| 2,424,218 | Begun | July 22, 1947 |
| 2,427,421 | Rieber | Sept. 16, 1947 |
| 2,429,236 | Potter | Oct. 21, 1947 |
| 2,439,446 | Begun | Apr. 13, 1948 |
| 2,475,245 | Leaver et al. | July 5, 1949 |
| 2,475,742 | Hammond, Jr. | July 12, 1949 |
| 2,502,215 | Giffen et al. | Mar. 28, 1950 |
| 2,513,683 | Shaper et al. | July 4, 1950 |
| 2,537,770 | Livingston et al. | Jan. 9, 1951 |
| 2,540,654 | Cohen et al. | Feb. 6, 1951 |

FOREIGN PATENTS

| | | |
|---|---|---|
| 483,395 | Great Britain | Apr. 20, 1938 |